(12) United States Patent
Makrakis et al.

(10) Patent No.: US 9,813,931 B2
(45) Date of Patent: Nov. 7, 2017

(54) ADAPTIVE PACKET PREAMBLE ADJUSTMENT

(71) Applicant: UNIVERSITY OF OTTAWA, Ottawa (CA)

(72) Inventors: Dimitrios Makrakis, Ottawa (CA); Hussein T. Mouftah, Ottawa (CA); Zhipeng Wang, Ottawa (CA); Tianyu Du, Ottawa (CA)

(73) Assignee: UNIVERSITY OF OTTAWA, Ottawa (CA)

( * ) Notice: Subject to any disclaimer, the term of this patent is extended or adjusted under 35 U.S.C. 154(b) by 562 days.

(21) Appl. No.: 14/446,155

(22) Filed: Jul. 29, 2014

(65) Prior Publication Data

US 2016/0037365 A1    Feb. 4, 2016

(51) Int. Cl.
| | |
|---|---|
| *H04L 27/26* | (2006.01) |
| *H04W 28/00* | (2009.01) |
| *H04L 1/00* | (2006.01) |
| *H04L 1/18* | (2006.01) |
| *H04L 1/20* | (2006.01) |

(52) U.S. Cl.
CPC ............... *H04W 28/00* (2013.01); *H04L 1/00* (2013.01); *H04L 1/1825* (2013.01); *H04L 1/203* (2013.01)

(58) Field of Classification Search
None
See application file for complete search history.

(56) References Cited

U.S. PATENT DOCUMENTS

| | | | |
|---|---|---|---|
| 7,215,683 B2 | 5/2007 | Burkert et al. | |
| 7,957,307 B2 | 6/2011 | Qiu et al. | |
| 8,463,955 B2 | 6/2013 | Pons et al. | |
| 2011/0305157 A1* | 12/2011 | Barr | H04L 27/2613 370/252 |

(Continued)

OTHER PUBLICATIONS

"CC2420 2.4 GHz IEEE 802.15.4 / ZigBee-ready RF Transceiver," Chipcon: SmartRF, pp. 1-87 (2004).

(Continued)

*Primary Examiner* — Gregory Sefcheck
*Assistant Examiner* — Jenkey Van
(74) *Attorney, Agent, or Firm* — Maschoff Brennan

(57) ABSTRACT

In some examples, an apparatus may be usable in a first network and configurable to operate within a proximity of a second network that communicates traffic that interferes with data communication in the first network. The apparatus may include a calculation module configured to calculate a packet loss rate. The apparatus may include a determination module coupled to the calculation module and configured to determine whether the packet loss rate exceeds a particular threshold level. The apparatus may include a preamble module coupled to the determination module and configured to dynamically adjust a number of protective bytes included in a packet preamble in response to a determination by the determination module that the packet loss rate exceeds the particular threshold level. The protective bytes may be effective to reduce packet corruption due to turnaround time collisions between packets communicated in the first network and traffic communicated in the second network.

20 Claims, 14 Drawing Sheets

(56) References Cited

U.S. PATENT DOCUMENTS

| | | | |
|---|---|---|---|
| 2012/0230205 A1* | 9/2012 | An | H04W 28/044 370/242 |
| 2012/0294233 A1* | 11/2012 | Radunovic | H04L 27/0006 370/328 |
| 2012/0307842 A1 | 12/2012 | Petrov et al. | |
| 2015/0003424 A1* | 1/2015 | Hund | H04J 3/0605 370/336 |

OTHER PUBLICATIONS

"dBm," Accessed at http://web.archive.org/web/20140627084423/http://en.wikipedia.org/wiki/DBm, Accessed on Jul. 11, 2014, pp. 7.

"Propagation data and prediction methods for the planning of indoor radio communication systems and the radio local area networks in the frequency range 900 MHz to 100 GHz," ITU-R Recommendations, Geneva, pp. 28 (1997-1999-2001-2003-2005-2007-2009-2012).

Angrisani, L. et al., "Experimental study of coexistence issues between IEEE 802.11b and IEEE 802.15.4 wireless networks," IEEE Trans. Instrum. Meas., vol. 57, No. 8, pp. 1514-1523, (2008).

Dainotti, A. et al., "A tool for the generation of realistic network workload for emerging networking scenarios," Computer Networks (Elsevier), vol. 56, No. 15, pp. 3531-3547, (2012).

Francesco, M. Di, et al., "An adaptive algorithm for dynamic tuning of MAC parameters in IEEE 802.15.4/ZigBee sensor networks," 8th IEEE Intl. Conf. on Pervasive Comput. Commun. Workshops (PERCOM Workshops), pp. 400-405 (2010).

Ha, J. Y. et al., "An enhanced CSMA-CA algorithm for IEEE 802.15.4 LR-WPANs," IEEE Commun. Lett., vol. 11, No. 5, pp. 461-463, (2007).

Huang, M. L. and Park, S., "A WLAN and ZigBee coexistence mechanism for wearable health monitoring system," 9th Intl. Symp. Commun. and Inf. Technol., ISCIT 2009, pp. 555-559, (2009).

Jung, B. H. et al., "Interference mediation for coexistence of WLAN and ZigBee networks," IEEE 19th International Symposium on Personal, Indoor and Mobile Radio Communications PIMRC 2008, pp. 1-5, (2008).

Mondal, A., "When TCP Friendliness Becomes Harmful," 26th IEEE International Conference on Computer Communications, pp. 152-160 (2007).

Nakatsuka, K. et al., "A proposal of the co-existence MAC of IEEE 802.11b/g and 802.15.4 used for the wireless sensor network," 5th IEEE Conf. on Sensors, pp. 722-725, (2006).

Petrova, M. et al., "Interference measurements on performance degradation between collocated IEEE 802.11g/n and IEEE 802.15.4 networks," 6th Intl. Conf. Netw., 2007(ICN '07), pp. 93-98, (2007).

Shin, S. Y. et al., "Packet error rate analysis of ZigBee under WLAN and Bluetooth interferences," IEEE Trans. Commun., vol. 6, No. 8, pp. 2825-2830, (2007).

Wang, Z. et al., "ACK with Interference Detection Technique for ZigBee Network under Wi-Fi Interference," 2013 Eighth International Conference on Broadband, Wireless Computing, Communication and Applications (BWCCA), pp. 128-135 (Oct. 28-30, 2013).

Yi, P. et al., "Developing ZigBee deployment guideline under WiFi interference for smart grid applications," IEEE Trans. Smart Grid, vol. 2, No. 1, pp. 110-120, (2011).

Yi, P. et al., "Frequency agility in a ZigBee network for smart grid application," IEEE Innovative Smart Grid Technol. (ISGT), pp. 8 (2010).

Yuan, W. et al., "A coexistence model of IEEE 802.15.4 and IEEE 802.11b/g," 14th IEEE Symp. Commun. Veh. Technol. in the Benelux, pp. 1-5, (2007).

Yuan, W. et al., "Adaptive CCA for IEEE 802.15.4 wireless sensor networks to mitigate interference," IEEE Wirel. Commun. Netw. Conf. (WCNC) 2010, pp. 1-5, (2010).

Zeghdoud, M. et al., "Impact of clear channel assessment mode on the performance of ZigBee operating in a WiFi environment," 1st Workshop on Operator-Assisted (Wireless Mesh) Community Networks, pp. 1-8, (2006).

* cited by examiner

ADAPTIVE PACKET PREAMBLE ADJUSTMENT

BACKGROUND

Unless otherwise indicated herein, the materials described herein are not prior art to the claims in the present application and are not admitted to be prior art by inclusion in this section.

ZigBee is an example of a low-cost, low-power, wireless mesh networking standard. The low cost may make the technology widely used in control and monitoring applications. The low power usage may allow longer life with smaller batteries, while the mesh networking may provide high reliability and larger range. ZigBee devices, which are sometimes referred to as ZigBee motes, may operate at about a 2.4 gigahertz (GHz) frequency band (2400-2483.5 MHz), known worldwide as Industrial, Scientific, and Medical (ISM) unlicensed band. However, the 2.4 GHz band may also be used by many unlicensed products, such as IEEE 802.11b/g/n wireless local area networks (WLAN) and Bluetooth wireless personal area networks (WPAN) or other wireless networks. There are signs of growing interference problems between networks such as ZigBee networks and WLANs. The expectation is that the interference problems may worsen. Among all interferers, a WLAN can cause a severe interference problem for ZigBee networks, due to the considerably higher transmission power that the WLAN may use and the pervasive deployment of Wi-Fi devices.

SUMMARY

Techniques described herein generally relate to adaptive packet preamble adjustment. Some techniques further include retransmission control.

In some examples, an apparatus may be usable in a first network and may be configurable to operate within a proximity of a second network that communicates traffic that may interfere with data communication in the first network. The apparatus may include a calculation module, a determination module, and a preamble module. The calculation module may be configured to calculate a packet loss rate. The determination module may be coupled to the calculation module and may be configured to determine whether the packet loss rate exceeds a particular threshold level. The preamble module may be coupled to the determination module and may be configured to dynamically adjust a number of protective bytes included in a packet preamble in response to a determination by the determination module that the packet loss rate exceeds the particular threshold level. The protective bytes may be effective to reduce packet corruption due to turnaround time collisions between packets communicated in the first network and traffic communicated in the second network.

In some examples, a method may include calculating a total packet loss rate over a period of time (Total PLR). The method may include determining whether the Total PLR is greater than a maximum tolerable packet loss rate associated with an application (App PLR). In response to the Total PLR being greater than the App PLR, the method may include determining whether a number of protective bytes included in a packet preamble of a packet is less than a maximum number of protective bytes for packet preambles. In response to the number of protective bytes being less than the maximum number of protective bytes, the method may include increasing a number of protective bytes in a packet preamble of a subsequently transmitted packet.

In some examples, a node of a first network may be configurable to operate within a proximity of a second network that communicates traffic that may interfere with data communication in the first network. The node may include a processor and a non-transitory computer-readable medium coupled to the processor and including computer-readable instructions stored thereon, which in response to execution by the processor, cause the processor to perform or cause the processor to control performance of operations. The operations may include calculating a Total PLR. The operations may include calculating a packet loss rate due to cyclic redundancy check errors after a total number of transmission attempts allowed for sending a packet (N-CRC PLR). The total number of transmission attempts allowed for sending a packet may be equal to a sum of one and a retries variable (Retries) indicating a maximum number of packet retransmission attempts allowed after a packet transmission failure. The operations may include defining a maximum value of the Retries after which Retries stops increasing (MaxRetries). The operations may include determining whether the Total PLR is greater than an App PLR. In response to the Total PLR being greater than the App PLR, the operations may include determining whether the N-CRC PLR is greater than the App PLR. In response to the N-CRC PLR being equal to or less than the App PLR, the operations may include determining whether a number of protective bytes included in a packet preamble of a packet is less than a maximum number of protective bytes for packet preambles. In response to the number of protective bytes being less than the maximum number of protective bytes, the operations may include increasing the number of protective bytes for a subsequent transmission of the packet and maintaining the Retries. In response to the N-CRC PLR being greater than the App PLR, the operations may include redefining the Retries to be a lower of the MaxRetries or the Retries incremented by one and setting the number of protective bytes to zero such that the packet preamble includes a default number of bytes.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings. In the drawings:

FIG. 3b illustrates an example setup similar to the ZigBee/Wi-Fi operating environment of FIG. 3a;

DETAILED DESCRIPTION

Figure 1:
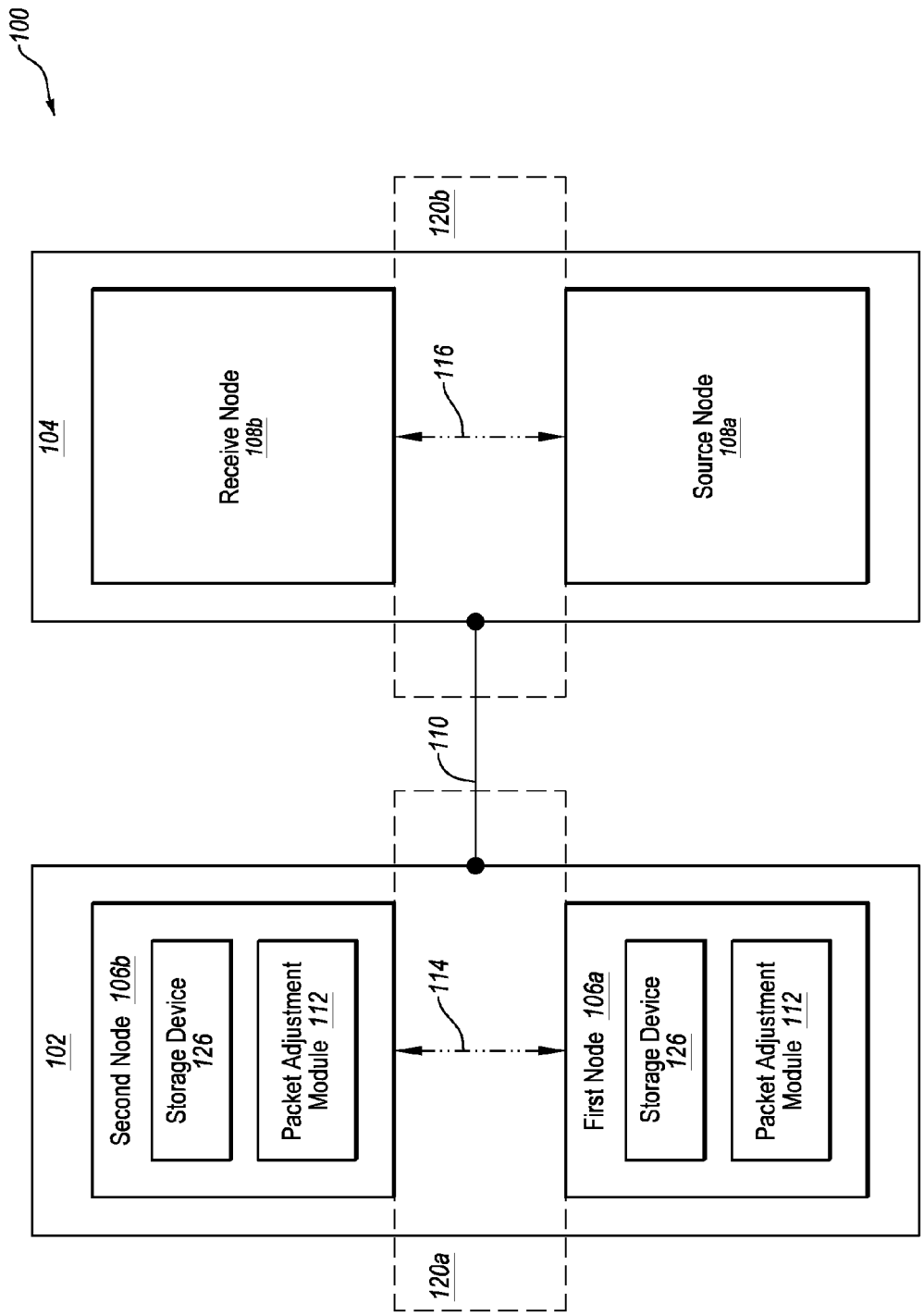
FIG. 1 is a block diagram of an example operating environment in which packet communication in a first network may occur under interference from a second network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to adaptive packet preamble adjustment.

Briefly stated, in some examples, an apparatus may be usable in a first network and configurable to operate within a proximity of a second network that communicates traffic that interferes with data communication in the first network. The apparatus may include a calculation module configured to calculate a packet loss rate. The apparatus may include a determination module coupled to the calculation module and configured to determine whether the packet loss rate exceeds a particular threshold level. The apparatus may include a preamble module coupled to the determination module and configured to dynamically adjust a number of protective bytes included in a packet preamble in response to a determination by the determination module that the packet loss rate exceeds the particular threshold level. The protective bytes may be effective to reduce packet corruption due to turnaround time collisions between packets communicated in the first network and traffic communicated in the second network.

Studies have shown that low-power wireless sensor networks (WSN), such as ZigBee-based WSN, may be vulnerable to interference from wireless fidelity (Wi-Fi) wireless local area networks (WLAN). Specifically, there may be performance degradation exhibited in the ZigBee-based WSN (e.g., an IEEE 802.15.4 network) when subjected to interference from a WLAN. A contributor to the degradation may include lost packets due to turnaround time collisions between the interfering traffic of the WLAN and packet headers of the ZigBee packets. The losses of the ZigBee packets may result in retransmission of data packets in a WSN. The retransmission may waste channel bandwidth and energy.

In particular, clear channel assessment (CCA) with energy detection (ED) functions may be adopted by WLAN and WSN standards such as the IEEE 802.11 standard and the IEEE 802.15.4 standard. CCA with ED may help determine a state of an operating channel. For example, a Wi-Fi node may detect that energy present in the operating channel is above an ED threshold. The energy may be caused by ZigBee packets in transmission. In response, the Wi-Fi node may defer packet transmission, which may avoid packet collision with the ZigBee packets in transmission.

However, some WSNs and other communication networks may have a relatively long receive to transmit (RX-TX) turnaround time. The RX-TX turnaround time may include time lapsing between the completion of ED and the starting of packet transmission. An example of the RX-TX turnaround time for ZigBee WSNs may be about 192 microseconds (μs). Accordingly, ZigBee packet transmissions may still suffer significant performance degradation when the energy caused by the ZigBee packets in transmission may be detected by a node in a potentially interfering wireless network such as a WLAN. For instance, a transmitting Wi-Fi node may perform the ED during an RX-TX turnaround time. Accordingly, the Wi-Fi node may determine that the operating channel is idle and may start to transmit a Wi-Fi packet. The Wi-Fi packet may then collide with a ZigBee packet communicated after the RX-TX turnaround time. Generally, Wi-Fi packets may be communicated with a relatively short Wi-Fi packet transmission time. Thus, in circumstances in which a Wi-Fi packet collides with a ZigBee packet, a synchronization header (SHR) and physical layer (PHY) header (PHR) of the ZigBee packet may be corrupted.

After the SHR and/or the PHR are corrupted, the ZigBee packet may not be received by a receiving ZigBee node such as a ZigBee coordinator. If only the PHY service data unit (PSDU) of the ZigBee packet is corrupted by the Wi-Fi interference, then the receiving ZigBee node may receive a packet with cyclic redundancy check (CRC) error that may be discarded automatically.

Some embodiments disclosed herein may be configured to add one or more protective bytes to the packet preamble of a packet. Additionally, in some embodiments, the number of protective bytes added to the packet preamble may be dynamically adjusted. Inclusion of the protective bytes in the packet preambles may be effective to reduce packet corruption due to turnaround time collisions between packets communicated in a first network and traffic communicated in a second network.

FIG. 1 is a block diagram of an example operating environment 100 in which packet communication in a first network 102 may occur under interference from a second network 104, arranged in accordance with at least some embodiments described herein. The first network 102 may include a first node 106a and a second node 106b. The first node 106a may be configured to communicate with the second node 106b. Additionally, the second node 106b may be configured to communicate with the first node 106a. At least some of the communication (referred to herein as first network traffic 114) between the first node 106a and the second node 106b may include communication of data packets.

The second network 104 may include a source node 108a and a receive node 108b. The source node 108a may be configured to transmit or otherwise provide a signal that enables the receive node 108b to communicate data in the second network 104. The data communicated in the second network 104 is referred to herein as second network traffic 116.

Generally, the first network 102 and the second network 104 may be within some proximity 110 of one another. The proximity 110 between the first network 102 and the second network 104 may cause interference between data communicated in the first network 102 and the second network traffic 116 communicated in the second network 104. In particular, the interference may cause packet transmission failure. The packet transmission failure may include corruption of packet header. The corruption of the packet headers may result in rejection of packets between the first node 106a and the second node 106b. The failure of the packets may result in retransmission of packets between the first node 106a and the second node 106b.

In the first network 102, packet communication, generally indicated by the first network traffic 114, may include communication of a packet in a first operating channel 120a. Specifically, the first node 106a (or the second node 106b) may perform an ED prior to transmission of the packet to the second node 106b (or the first node 106a). Between a completion of the ED and the first node 106a beginning to transmit the packet may be a RX-TX turnaround time. During the RX-TX turnaround time in the first network 102, the packet is not transmitted, and thus the first operating channel 120a may not include energy levels indicative of packet communication of first network traffic 114 in the first network 102.

The source node 108a in the second network 104 may perform another ED to determine a state of a second operating channel 120b prior to communicating packets in the second network traffic 116. In some circumstances such as during high rates of communication in the second network 104, the ED performed by the source node 108a may occur during the RX-TX turnaround time in the first network 102. The source node 108a may accordingly detect an energy level indicative of a clear or unused operating channel and may begin transmitting packets. The packets communicated by the source node 108a may collide with packet headers of the packets communicated by the first node 106a, which is referred to herein as a turnaround time collision.

In some embodiments, the first operating channel 120a and the second operating channel 120b may include a single operating channel (e.g., two operating channels including a same frequency range) or may include two or more operating channels with some overlap. For example, a ZigBee WSN may use ZigBee channel 20 (2.449-2.451 gigahertz (GHz)) which may overlap with Wi-Fi channel 9 (2.441-2.463 GHz). The ZigBee channel 20 may include a portion of the Wi-Fi channel 9.

To reduce packet loss due to the turnaround time collisions, in some embodiments, the first node 106a and/or the second node 106b may include a packet adjustment module 112. The packet adjustment module 112 may be configured to adjust a number of protective bytes, which may be nonfunctional or "dummy" bytes, to the packet preambles of the packets communicated in the first network. The turnaround time collisions may still occur. However, the turnaround time collisions may result in corruption of the protective bytes, which may not affect functionality of the packet and/or reception of the packet.

Additionally or alternatively, the packet adjustment module 112 may adjust the number of protective bytes included in the packet preamble. For example, the packet adjustment module 112 may increase and/or reduce a number of protective bytes in the packet preamble. In some embodiments, the packet adjustment module 112 may be configured to adjust the number of protective bytes in the packet preamble based on whether one or more packet loss rates exceed or do not exceed a particular threshold level.

Additionally or alternatively, the packet adjustment module 112 may increment or decrement a maximum number of packet retransmission attempts allowed after a packet transmission failure, which is herein represented by a retries variable (Retries). For example, the packet adjustment module 112 may increment or decrement the Retries based on whether one or more packet loss rates exceed or do not exceed a particular threshold level or based on a relationship between the packet loss rates. For example, if the packet preambles include a maximum number of protective bytes, the packet adjustment module 112 may increment the Retries.

In some embodiments, the maximum value (or other value) at which Retries stops increasing may be defined herein as (MaxRetries). Generally, the packet adjustment module 112 may adjust the Retries between the MaxRetries and zero. For instance, the packet adjustment module 112 may increase the Retries to improve the packet loss rate. The maximum value of the Retries may be the MaxRetries. When the Retries is equal to the MaxRetries, the packet adjustment module 112 may not increase the Retries any further. The packet adjustment module 112 may also reduce the Retries to zero, at which retransmission is disabled. An example of when the Retries is zero may be when the interference is not heavy.

When the packet adjustment module 112 determines interference has decreased, the packet adjustment module 112 may first try to reduce the Retries. After the Retries is equal to zero (e.g., retransmission is disabled) the packet adjustment module 112 may reduce the number of protective bytes to further reduce the overhead and increase the transmission efficiency. The reduction in the number of protective bytes may be based on CCA failure rate. Lower CCA failure rate may indicate less interference, thus allowing packet adjustment module 112 to reduce the number of protective bytes.

Other factors or combination of factors thereof may be used by the packet adjustment module 112 in determining whether to make an adjustment to the packet preambles and/or the Retries and/or the amount of the adjustment.

In some embodiments, the packet adjustment module 112 may disable retransmission of the packet (e.g., set Retries to zero). For example, the packet adjustment module 112 may disable retransmission in circumstances in which preamble adjustments, which may include additions of protective bytes, alone may sufficiently deal with interference caused by second network traffic 116 and maintain a desired packet loss rate.

For example, in some embodiments, the packet adjustment module 112 may calculate a total packet loss rate over a period of time (Total PLR) and a packet loss rate due to cyclic redundancy check errors after a total number of transmission attempts allowed for sending a packet (N-CRC PLR). Specifically, the Total PLR and the N-CRC PLR may be calculated for the first network 102 over a particular period of time. The total number of transmission attempts allowed for sending a packet may be equal to a sum of one and the Retries. The packet adjustment module 112 may then determine whether the Total PLR is greater than a maximum tolerable packet loss rate associated with an application (App PLR).

In response to the Total PLR being greater than the App PLR, the packet adjustment module 112 may determine whether the N-CRC PLR is greater than the App PLR. In some circumstances, an adjustment to the number of protective bytes included in a packet preamble may be more efficient than retransmission of a corrupt packet. However, increasing a number of protective bytes in a packet preamble may not reduce a packet loss rate due to cyclic redundancy check (CRC) errors. Therefore, in some embodiments, the packet adjustment module 112 may determine whether the N-CRC PLR is greater than App PLR prior to adjusting the number of protective bytes. Comparing the N-CRC PLR to the App PLR may increase a rate at which an optimal number of protective bytes is determined. In other embodiments, the packet adjustment module 112 may not compare the N-CRC PLR to the App PLR.

In response to the N-CRC PLR being equal to or less than the App PLR, the packet adjustment module 112 may determine whether the number of protective bytes included in the packet preamble is less than a maximum number (or other number) of protective bytes for packet preambles. In some embodiments, the maximum number (or other number) of protective bytes may include 13 bytes. In other embodiments, the maximum number (or other number) of protective bytes may be less than 13 bytes or may be greater than 13 bytes.

In addition, in response to the number of protective bytes being less than the maximum number (or other number) of protective bytes, the packet adjustment module 112 may increase the number of protective bytes for a subsequent transmission of the packet and maintain the Retries. In response to the N-CRC PLR being greater than the App PLR, the packet adjustment module 112 may redefine the Retries to be a lower of the MaxRetries or the Retries incremented by one and may set the number of protective bytes to zero such that the packet preamble includes a default number of bytes.

Additionally, in these and other embodiments, in response to the number of protective bytes being equal to the maximum number (or other number) of protective bytes, the packet adjustment module 112 may be configured to redefine the Retries to be a lower of the MaxRetries or the Retries incremented by one and to set the number of protective bytes to zero such that the packet preamble includes a default number of bytes.

Additionally, in response to the Total PLR being less than or equal to the App PLR, the packet adjustment module 112 may determine whether the Retries is greater than zero. In response to the Retries not being greater than zero, the packet adjustment module 112 may record a number (e.g., 200) of CCA ED detections and calculate CCA failure rates based on the CCA ED detections. The packet adjustment module 112 may then determine whether the CCA failure rate is less than a particular clear channel assessment threshold (CCA-Fail Threshold). In response to the CCA failure rate being less than the CCA-Fail Threshold, the packet adjustment module 112 may reduce the number of protective bytes. In response to the CCA failure rate being greater than or equal to the CCA-Fail Threshold, the packet adjustment module 112 may maintain the number of protective bytes and may maintain the Retries.

In response to the Total PLR being less than or equal to the App PLR, the packet adjustment module 112 may determine whether the Retries is greater than zero. In response to the Retries being greater than zero, the packet adjustment module 112 may determine a CRC packet loss rate for the Retries (N−1-CRC PLR) and determine whether the N−1-CRC PLR is less than the App PLR.

In this operation, the adjustment module 112 is examining a possibility of reducing the Retries by one. After reducing Retries by one (e.g., Retries−1), the new "total number of transmission attempts allowed for sending a packet" becomes the sum of the Retries and one, which is then reduced by one (e.g., Retries+1−1). Because preamble adjustment (e.g., padding or removing) may not reduce CRC errors, adjustment module 112 may first determine whether the packet loss rate due to CRC errors after the new total number (e.g., Retries+1−1) of transmission attempts allowed for sending a packet, which is represented by N−1-CRC PLR, satisfies the App PLR.

In response to the N−1-CRC PLR being greater than or equal to the App PLR, the packet adjustment module 112 may maintain the number of protective bytes and may maintain the Retries. In response to the N−1-CRC PLR being less than the App PLR, the packet adjustment module 112 may set the number of protective bytes to a default number and may decrement the Retries by one. In some embodiments, the default number may include eight bytes. In other embodiments, the default number may include fewer than eight bytes or more than eight bytes.

The packet adjustment module 112, according to some embodiments, may be embedded into firmware of a node or a device such as a Crossbow MICAz mote as one example. Additionally or alternatively, the packet adjustment module 112 may be deployed in a standard-based wireless communication device, a sensor, in a consumer electronic device, a ZigBee/IEEE 802.15.4 device, or other suitable device.

The packet adjustment module 112 may include code and routines for packet preamble adjustment. In some embodiments, the packet adjustment module 112 may be implemented using hardware including a field-programmable gate array (FPGA) or an application-specific integrated circuit (ASIC). Alternately or additionally, the packet adjustment module 112 may be implemented using a combination of hardware and software. In some embodiments, the packet adjustment module 112 may be embodied by one or more processors. Still further in some embodiments, processor(s) may be configured to execute computer-readable instructions stored on a non-transitory computer-readable medium that is operatively coupled to the processor(s), in order to provide the features, operations, and functionality of the packet adjustment module 112 described herein.

One or more of the first node 106a and/or the second node 106b may include a storage device 126 which may include a non-transitory memory (which may be an embodiment of the computer-readable medium described above) that stores data for providing the features, operations, and functionality described herein. The memory may include a dynamic random access memory (DRAM) device, a static random access memory (SRAM) device, flash memory, or some other memory device(s) configured to perform storage. In some embodiments, the storage device 126 may include a nonvolatile memory or similar permanent storage device and media including a hard disk drive (HDD), a flash memory device, or some other mass storage device for storing information on a more permanent basis.

The above examples are described in the context of the first node 106a being the transmit node, while the second node 106b is the recipient node, and subsets of the operations are described above with respect to the packet adjustment module 112 of the first node 106a or the packet adjustment module 112 of the second node 106b. Similar operations may be performed by either or both of the packet adjustment modules 112 of the first node 106a and the second node 106b, depending on which of the first node 106a and the second node 106b operates as a recipient node or a transmit node for a data packet.

Moreover, although the first network 102 is illustrated in FIG. 1 as including two nodes (e.g., the first node 106a and the second node 106b), more generally, the first network 102 may include two or more nodes and any subset thereof may include a packet adjustment module such as the packet adjustment module 112. Likewise, the second network 104 may include multiple source nodes 108a and/or multiple receive nodes 108b. Additionally or alternatively, the operating environment 100 may include multiple other networks on which traffic may be communicated that may interfere with the packets of the first network 102.

The first network 102 and the second network 104 may include different types of networks or a single type of network. As used herein, the term "type(s) of network(s)" may indicate devices (e.g., the first node 106a and the second node 106b) that are configured to communicate using a common communication standard. For example, the first network 102 may include a ZigBee network and the second network 104 may include a second ZigBee network. Alternatively, the first network 102 may include a Bluetooth network (e.g., a network having devices substantially compliant with IEEE 802.15.1 or equivalent special interest group (SIG) standard) and the second network 104 may include a Wi-Fi network. In still another example, the first network 102 may include a ZigBee network and the second network 104 may include a Wi-Fi network, a Bluetooth network, and/or another network (including combinations thereof) that is different from a ZigBee network. Communication standards may include, but are not limited to, IEEE 802 standards such as 802.11a/b/g/n, 802.15.1, and 802.15.4.

Figure 2:
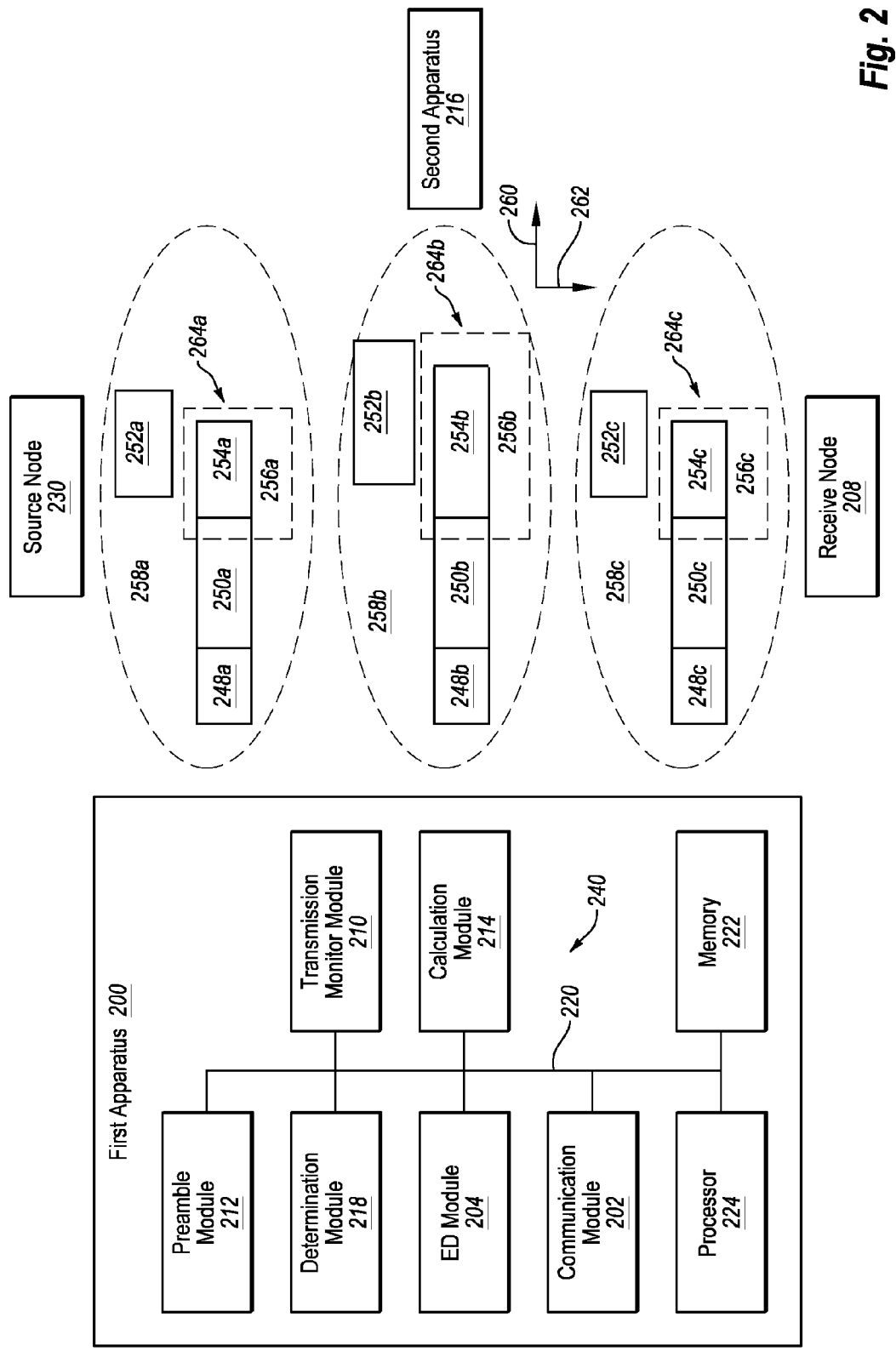
FIG. 2 is a block diagram of an example node that may be implemented in the operating environment of FIG. 1.

FIG. 2 is a block diagram of an example node (depicted at least in part by a first apparatus 200) that may be implemented in the operating environment 100 of FIG. 1. For example, the first apparatus 200 may be included in the first node 106a and/or the second node 106b of the operating environment 100 of FIG. 1.

The first apparatus 200 may include a processor 224, a memory 222 or other storage unit, a communication module 202, an ED module 204, a preamble module 212, a determination module 218, a transmission monitor module 210, and a calculation module 214. The processor 224, the memory 222, the communication module 202, the preamble module 212, the determination module 218, the transmission monitor module 210, the calculation module 214, the ED module 204, any portion thereof, or any combination thereof may be communicatively coupled to each other by a bus 220.

The processor 224 may include an arithmetic logic unit (ALU), a microprocessor, a general-purpose controller, or some other processor device or processor array to communicate a first packet 264a, a second packet 264b, and a third packet 264c (generally, packet 264 or packets 264) and/or to adjust a first number of protective bytes 254a, a second number of protective bytes 254b, and a third number of protective bytes 254c (generally, the number of protective bytes 254) included in a first packet preamble 256a, a second packet preamble 256b, and a third packet preamble 256c (generally, packet preamble 256 or packet preambles 256), respectively. In the embodiment depicted in FIG. 2, the packets 264 may be generally communicated in a direction indicated by a first arrow 260.

Additionally, in FIG. 2, the first packet 264a may include a first header 250a and a first data unit 248a, the second packet 264b may include a second header 250b and a second data unit 248b, and the third packet 264c may include a third header 250c and a third data unit 248c. In some of the examples provided herein, the first packet 264a may be communicated prior to the second packet 264b and/or the third packet 264c. Additionally or alternatively, the second packet 264b may be communicated prior to the third packet 264c. The first packet preamble 256a includes a portion of the first header 250a and the first number of protective bytes 254a, the second packet preamble 256b includes a portion of the second header 250b and the second number of protective bytes 254b, and the third packet preamble 256c includes a portion of the third header 250c and the third number of protective bytes 254c.

The processor 224 may be coupled to the bus 220 for communication with one or more of the other components (e.g., 202, 204, 210, 212, 214, 218, and 222) of the first apparatus 200. The processor 224 may generally process data signals and may include various computing architectures including a complex instruction set computer (CISC) architecture, a reduced instruction set computer (RISC) architecture, or an architecture implementing some other instruction set(s) and/or a combination of instruction sets. Although FIG. 2 includes a single processor 224, multiple processors may be included in the first apparatus 200. Other processors, operating systems, and physical configurations may be possible.

The memory 222 may be configured to store instructions and/or data at least temporarily that may be executed or manipulated by the processor 224. The memory 222 may be coupled to the bus 220 for communication with the one or more of the other components (e.g., 202, 204, 210, 212, 214, and 218). The instructions and/or data may include code for performing the techniques or methods described herein. The memory 222 may be a DRAM device, an SRAM device, flash memory, or some other memory device. In some embodiments, the memory 222 may include a nonvolatile memory or similar permanent storage device and media for storing information on a more permanent basis.

The ED module 204 may be configured to perform ED in an operating channel between the first apparatus 200 and a second apparatus 216. For example, the ED module 204 may perform an ED prior to communication of the packets 264. The ED module 204 may include hardware components such as an antenna or other ED instrumentations. One or more of the hardware components included in the ED module 204 may be coupled to the bus 220. Additionally or alternatively, the ED module 204 may include software components that may be configured to interface with the hardware components.

The communication module 202 may be configured to transmit and/or receive the packets 264 to and/or from the second apparatus 216. In the embodiment depicted in FIG. 2, the first apparatus 200 may communicate the packets 264 to the second apparatus 216. However, in some embodiments, the second apparatus may be substantially similar to the first apparatus 200 and/or may communicate packets such as the packets 264 to the first apparatus 200.

In some embodiments, the communication module 202 may include a wireless transceiver for exchanging the packets 264 via communication channels using one or more wireless communication methods, including IEEE 802.11, IEEE 802.16, BLUETOOTH®, IEEE 802.15.4, or another suitable wireless communication method or combinations thereof. In some embodiments, the communication module 202 may include a cellular communications transceiver for sending and receiving the packets 264 over a cellular communications network including via short messaging service (SMS), multimedia messaging service (MMS), hypertext transfer protocol (HTTP), direct data connection, wireless application protocol (WAP), e-mail, or another suitable type of electronic communication or combinations thereof. In some embodiments, the communication module 202 may include a wired port and a wireless transceiver.

The calculation module 214 may be configured to calculate one or more packet loss rates. For example, the calculation module 214 may be configured to calculate a Total PLR, an N-CRC PLR, an N−1-CRC PLR, or any combination thereof. Additionally or alternatively, in some embodiments, the calculation module 214 may be configured to calculate CCA failure rates for a particular number of ED assessments subsequent to packet retransmission being disabled. In some embodiments, the CCA failures may be calculated for about 200 ED assessments. Some additional details of the packet retransmission are provided below.

The determination module 218 may be configured to determine whether the one or more packet loss rates (e.g., the Total PLR, the N-CRC PLR, and the N−1-CRC PLR) exceed a particular threshold level and/or relationships therebetween. An example of the particular threshold level may include a maximum tolerable packet loss rate associated with an application (App PLR). For example, in some embodiments, the determination module 218 may be configured to determine whether the N-CRC PLR is greater than the App PLR. Additionally or alternatively, the determination module 218 may be configured to determine whether the N−1-CRC PLR and/or the Total PLR is greater than, equal to, or greater than or equal to the particular threshold level.

Additionally or alternatively, the determination module 218 may be configured to determine whether the number of protective bytes 254 included in one of the packet preambles 256 is less than a maximum number (or other number) of protective bytes for packet preambles. In some embodiments, the determination module 218 may be configured to determine whether the CCA failure rate is less than a CCA-Fail Threshold. An example of the CCA-Fail Threshold may include about 5%. Additionally, in other embodiments, the CCA-Fail Threshold may include a value below 5% or above 5% and/or may be adjusted.

The transmission monitor module 210 may be configured to increment or decrement the Retries. In some embodiments, the transmission monitor module 210 may increment the Retries based at least partially on a determination by the determination module 218 whether one or more of the packet loss rates exceeds the particular threshold level and/or a determination by the determination module 218 that a packet preambles 256 includes a maximum number of protective bytes. Additionally, in these embodiments, the transmission monitor module 210 may decrement the Retries based at least partially on a determination by the determination module 218 whether one or more of the packet loss rates falls below the particular threshold level.

The preamble module 212 may be configured to dynamically adjust the number of protective bytes 254 included in one of the packet preambles 256. For example, the preamble module 212 may be configured to adjust the number of protective bytes 254 in response to a determination by the determination module 218 that one or more of the packet loss rates exceeds the particular threshold level.

In some embodiments, the preamble module 212 may be configured to increase the number of protective bytes 254 in one or more of the packet preambles 256 in response to a determination by the determination module 218 that one or more of the packet loss rates exceeds the particular threshold level. For example, the determination module 218 may determine that the Total PLR exceeds the App PLR. The determination module 218 may communicate the determination to the preamble module 212. The preamble module 212 may, in response, increase a number of protective bytes included in the first number of protective bytes 254a.

The protective bytes that may be added to the packet preambles 256 may be effective to reduce packet corruption due to turnaround time collisions. In the embodiment depicted in FIG. 2, the packet preambles 256 may be effective to reduce packet corruption due to the turnaround collisions between the packets 264 communicated by the first apparatus 200 and a first interference packet 252a, second interference packets 252b, and a third interference packet 252c (generally, interference packet 252 or interference packets 252) communicated between a source node 230 and a receive node 208. In the embodiment depicted in FIG. 2, the interference packets 252 may be generally communicated in a direction indicated by a second arrow 262.

For example, in a first circumstance 258a, after the first number of protective bytes 254a is increased, the first interference packet 252a may collide with the first number of protective bytes 254a. Rather than the first packet 264a being corrupted, the second apparatus 216 may receive the first packet 264a following the collision.

Additionally, in the first circumstance 258a, the first packet 264a including the first number of protective bytes 254a may be communicated between the first apparatus 200 and the second apparatus 216. The packet loss rates in the first circumstance 258a may exceed the particular threshold level. Accordingly, as depicted in a second circumstance 258b, the preamble module 212 may increase from the first number of protective bytes 254a to the second number of protective bytes 254b. After the first number of protective bytes 254a is increased to the second number of protective bytes 254b, the second interference packets 252b may collide with the second number of protective bytes 254b. Rather than the second packet 264b being corrupted, the second apparatus 216 may receive the second packet 264b following the collision.

A reason that one or more of the packet loss rates may exceed the particular threshold level may include an increase in the interference packets 252. For example, the second interference packets 252b may include a higher amount of interfering traffic than the first interference packet 252a, which is represented in FIG. 2 by the second interference packets 252b being larger.

Additionally or alternatively, the preamble module 212 may be configured to set the number of protective bytes 254 included in the packet preambles 256 to zero such that the packet preambles 256 include a default number of bytes. For example, the determination module 218 may be configured to determine whether the N-CRC PLR is greater than the particular threshold level. The determination module 218 may then communicate a corresponding determination to the transmission monitor module 210 and to the preamble module 212 that the N-CRC PLR is greater than the particular threshold level. In response to the determination, the preamble module 212 may set the number of protective bytes 254 included in the packet preambles 256 to zero such that the packet preambles 256 include a default number of bytes. The default number of bytes of the packet preambles may substantially comply with a particular standard, such as the IEEE 802.15.4 standard. Additionally, the transmission monitor module 210 may increment the Retries.

In another example, the determination module 218 may be configured to determine whether the number of protective bytes in the packets 264 is equal to a maximum number (or other number) of protective bytes. The determination module 218 may then communicate a corresponding determination to the transmission monitor module 210 and to the preamble module 212 that the number of protective bytes is equal to the maximum number (or other number) of protective bytes. In response to the determination, the preamble module 212 may set the number of protective bytes 254 included in the packet preambles 256 to zero (e.g., the packet preambles 256 include a default number of bytes) and the transmission monitor module 210 may increment the Retries.

Additionally or alternatively, the preamble module 212 may be configured to maintain the number of protective bytes 254 included in the packet preambles 256. In some embodiments, the preamble module 212 may maintain the number of protective bytes 254 in response to a determination by the determination module 218 that the N−1-CRC PLR is greater than or equal to the particular threshold level. For example, the first number of protective bytes 254a may include eight bytes. In response to a determination by the determination module 218 that the N−1-CRC PLR is greater than or equal to the particular threshold level, the preamble module 212 may maintain the first number of protective bytes 254a at eight bytes.

In some embodiments, the preamble module 212 may be configured to set the number of protective bytes 254 included in the packet preambles 256 to a default number. For example, the preamble module 212 may set the number of protective bytes 254 in response to a determination by the determination module 218 that the N−1-CRC PLR is less than the particular threshold. For example, the first number of protective bytes 254a may include four bytes. In response to a determination by the determination module 218 that the N−1-CRC PLR is less than the particular threshold level, the preamble module 212 may set the first number of protective bytes 254a to a default number of protective bytes. Accordingly, the packet preamble 256 may include a default number of bytes with the default number of protective bytes (e.g., 8 bytes).

Additionally or alternatively, the preamble module 212 may be configured to reduce the number of protective bytes 254 included in one or more of the packet preambles 256. For example, following the packet retransmission being disabled (e.g., Retries=0) and a determination by the determination module 218 that the Total PLR does not exceed the App PLR, the calculation module 214 may calculate the CCA failure rates for a particular number of ED assessments subsequent to packet retransmission being disabled. The determination module 218 may determine whether the CCA failure rate is lower than the CCA-Fail Threshold. In response to determining that the CCA failure rate is lower than the CCA-Fail Threshold, the preamble module 212 may reduce a number of protective bytes included in the packet preambles 256. For example, the preamble module 212 may reduce the number of protective bytes from the second number of protective bytes 254b to the third number of protective bytes 254c and/or from the third number of protective bytes 254c to the first number of protective bytes 254a.

For example, in the second circumstance 258b, the first number of protective bytes 254a may have been increased to the second number of protective bytes 254b. The Retries may be equal to zero and the packet loss rate may not exceed the particular threshold level. Moreover, the CCA failure rate may be lower than the CCA-Fail Threshold. In response, the preamble module 212 may reduce the number of protective bytes from the second number of protective bytes 254b to the third number of protective bytes 254c, which is shown in a third circumstance 258c. In addition, in the third circumstance 258c, after the second number of protective bytes 254b is reduced to the third number of protective bytes 254c, the preamble module 212 may further reduce the third number of protective bytes 254c to the first number of protective bytes 254a or to zero. Additionally or alternatively, in the third circumstance 258c, the determination module 218 may determine that one or more of the packet loss rates exceeds the particular threshold level. In response, the preamble module 212 may increase the number of protective bytes from the third number of protective bytes 254c to the second number of protective bytes 254b as discussed herein.

A reason that one or more of the packet loss rates may not exceed the particular threshold level may include a decrease in the interference packets 252. For example, the second interference packets 252b may include a higher amount of interfering traffic than the third interference packet 252c.

In some embodiments, increasing and decreasing the number of protective bytes included in the packets 264 may be done according to a fixed or semi-fixed scheme. For example, increasing the number of the protective bytes may include increasing the number of protective bytes from 0 bytes to 4 bytes, then increasing the number of protective bytes from 4 bytes to 8 bytes, and then increasing the number of protective bytes from 8 bytes to 13 bytes. Likewise, reducing the number of protective bytes may include reducing the number of protective bytes from 13 bytes to 8 bytes, reducing the number of protective bytes from 8 bytes to 4 bytes, and reducing the number of protective bytes from 4 bytes to 0 bytes. In other embodiments, the particular number of bytes by which the packet preambles 256 are increased or decreased may be done according to another fixed or semi-fixed scheme, or the particular number of bytes by which the packet preambles 256 are increased or decreased may be determined dynamically.

In some embodiments, one or more of the calculation module 214, the ED module 204, the transmission monitor module 210, the determination module 218, the preamble module 212, and the communication module 202 (collectively, modules 240), or portions thereof, may be included in a single module such as the packet adjustment module 112 of FIG. 1. Moreover, one or more of the modules 240 may be implemented as software including one or more routines configured to perform one or more operations discussed herein while one or more others of the modules 240 may be implemented as hardware configured to perform one or more of the operations discussed herein. The modules 240 may include a set of instructions executable by the processor 224 to provide the functionality, features, and operations described herein and/or may be controlled by the processor 224 executing the set of instructions. In some instances, the modules 240 may be stored in or at least temporarily loaded into the memory 222 of the first apparatus 200 and may be accessible and executable by the processor 224. One or more of the modules 240 may be adapted for cooperation and communication with the processor 224 and components of the first apparatus 200 via the bus 220.

Figure 3A:
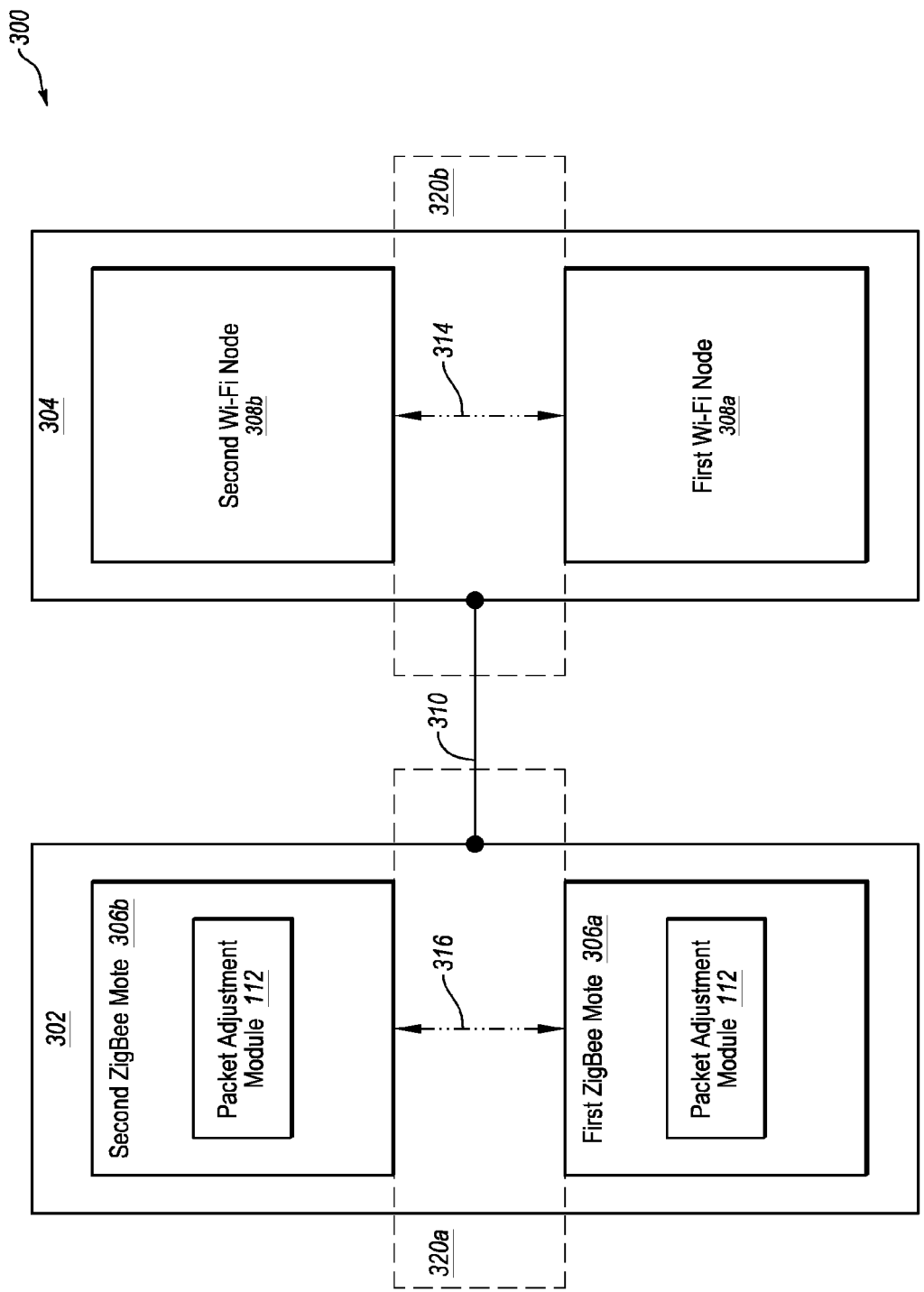
FIG. 3a illustrates a block diagram of an example ZigBee/Wi-Fi operating environment.

FIG. 3a illustrates a block diagram of an example ZigBee/Wi-Fi operating environment 300, arranged in accordance with at least some embodiments described herein. The ZigBee/Wi-Fi operating environment 300 may be a particular embodiment of the operating environment 100 of FIG. 1. Specifically, in the ZigBee/Wi-Fi operating environment 300, the first network 102 of FIG. 1 may include a ZigBee-type network 302 and the second network 104 of FIG. 1 may include a Wi-Fi-type WLAN 304. A proximity 310 between the ZigBee-type network 302 and the WLAN 304 may be about two meters, for instance. The proximity 310 may cause Wi-Fi traffic 314 to interfere with packet communication 316 in the ZigBee-type network 302.

The ZigBee-type network 302 may include a first ZigBee mote 306a and a second ZigBee mote 306b. The first ZigBee mote 306a and/or the second ZigBee mote 306b may each include the packet adjustment module 112 discussed with reference to FIG. 1. Additionally or alternatively, the first ZigBee mote 306a and/or the second ZigBee mote 306b may each include one or more of the modules 240 discussed with reference to FIG. 2. The WLAN 304 may include a first Wi-Fi node 308a and a second Wi-Fi node 308b.

In some embodiments, the WLAN 304 may include an IEEE 802.11b/g/n wireless router or another suitable Wi-Fi source as the first Wi-Fi node 308a. Additionally or alternatively, the WLAN 304 may include a laptop with Wi-Fi adapter or another suitable Wi-Fi sink as the second Wi-Fi node 308b. The Wi-Fi traffic 314 between the second Wi-Fi node 308b and the first Wi-Fi node 308a may substantially comply with the IEEE 802.11a/b/g/n or any other communication standard.

The ZigBee-type network 302 may include, for example, a Crossbow MICAz mote equipped with IEEE 802.15.4-compliant CC2420 transceiver or any other suitable ZigBee client as the first ZigBee mote 306a. Additionally or alternatively, the ZigBee-type network 302 may include, for example, a MICAz mote installed on a Crossbow MIB600 programming board or any other suitable ZigBee coordinator as the second ZigBee-type mote 306b. The second ZigBee mote 306b may communicate IEEE 802.15.4 traffic (and/or other types of traffic) to the first ZigBee mote 306a and vice versa.

The second ZigBee mote 306b and/or the first ZigBee mote 306a may also collect received data packets and perform statistic tasks such as calculating a number of received packets, lost packets, packets with CRC errors, and/or the others. The second ZigBee mote 306b and/or the first ZigBee mote 306a may be configured to perform ED, which may be used for monitoring the external interference (e.g., the Wi-Fi traffic 314) of a first ZigBee operating channel 320a, which may overlap to a Wi-Fi operating channel 320b. In addition, a number of protective bytes included in packet preambles of packets communicated by the second ZigBee mote 306b and/or the first ZigBee mote 306a may be adjusted.

In this and other embodiments, a media access control (MAC) layer of the second ZigBee mote 306b and/or the first ZigBee mote 306a may implement operations or functionalities of packet transmission. For convenience of terminology, in the following text, the term "packet" may refer to a PHY layer data unit while the term "frame" may refer to the MAC layer data unit.

The MAC layer frame may be passed to the PHY layer as the PHY service data unit (PSDU). The PSDU may be prefixed with a synchronization header (SHR) and a PHY header (PHR), forming the ZigBee packet. For example, with combined reference to FIGS. 2 and 3, the first packet 264a may include a ZigBee packet. The first data unit 248a may include the PSDU and the first header 250a may include a PHR and SHR header.

After performing an ED, a transmit mote (e.g., the second ZigBee mote 306b or the first ZigBee mote 306a) may communicate the ZigBee packet after a delay of a RX-TX turnaround time. The receive mote (e.g., the other of the second ZigBee mote 306b or the first ZigBee mote 306a) may receive the ZigBee packet and accept the ZigBee packet if the PHR and SHR headers are not corrupted through a turnaround time collision or another type of collision (e.g., the first or second Wi-Fi nodes 308a or 308b not detecting ZigBee packet transmission) with the Wi-Fi traffic 314. Due to the relatively short transmission time of packets included in the Wi-Fi traffic 314, a turnaround time collision may corrupt the SHR and PHR header of the ZigBee packet. After such corruption occurs, the ZigBee packet may not be received by the receive mote. Additionally, if the PSDU of the ZigBee packet is corrupted by the Wi-Fi traffic 314, the receive mote may receive the ZigBee packet with CRC error and may accordingly discard the ZigBee packet.

Figure 3B:
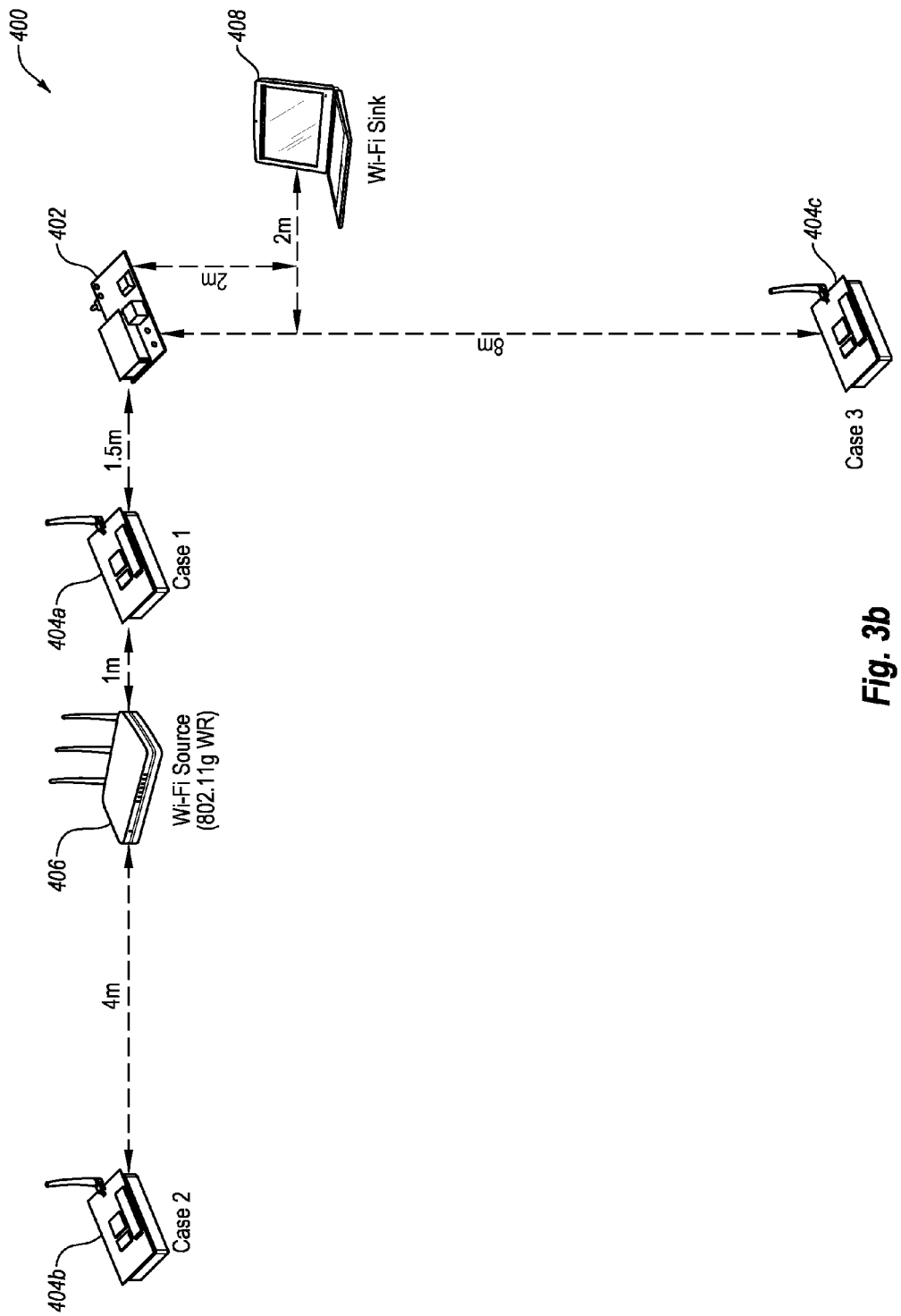

FIG. 3b illustrates an example setup 400 similar to the ZigBee/Wi-Fi operating environment 300 of FIG. 3a, arranged in accordance with at least some embodiments described herein. FIG. 3b includes a ZigBee coordinator 402, ZigBee clients 404a-404c, a wireless router (WR) 406, and a Wi-Fi sink 408. The ZigBee coordinator 402 and the ZigBee clients 404a-404c are examples of the first and second ZigBee motes 306a and 306b of FIG. 3a. The WR 406 and the Wi-Fi sink 408 are examples of the first and second Wi-Fi nodes 308a and 308b of FIG. 3a.

FIGS. 4a-4f depict example results in connection with operation of the example setup 400 of FIG. 3b, arranged in accordance with at least some embodiments described herein. With combined reference to FIGS. 3a, 3b, and 4a-4f, performance of ZigBee packet transmission may be evaluated under different interfering Wi-Fi traffic 314. The example results are shown in FIGS. 4a-4f with the data points marked with a 95% confidence interval, for instance. In each of FIGS. 4a-4f, example results from three cases are depicted, including Case 1, Case 2, and Case 3. Case 1, Case 2, and Case 3 each include results associated with communication between the ZigBee coordinator 402 and a corresponding one of the ZigBee clients 404a-404c in the presence of interference from communications between the Wi-Fi sink 408 and the WR 406, where the ZigBee coordinator 402, the ZigBee clients 404a-404c, the Wi-Fi sink 408 and the WR 406 are arranged and spaced apart from each other as generally illustrated in FIG. 3b.

Figure 4A:
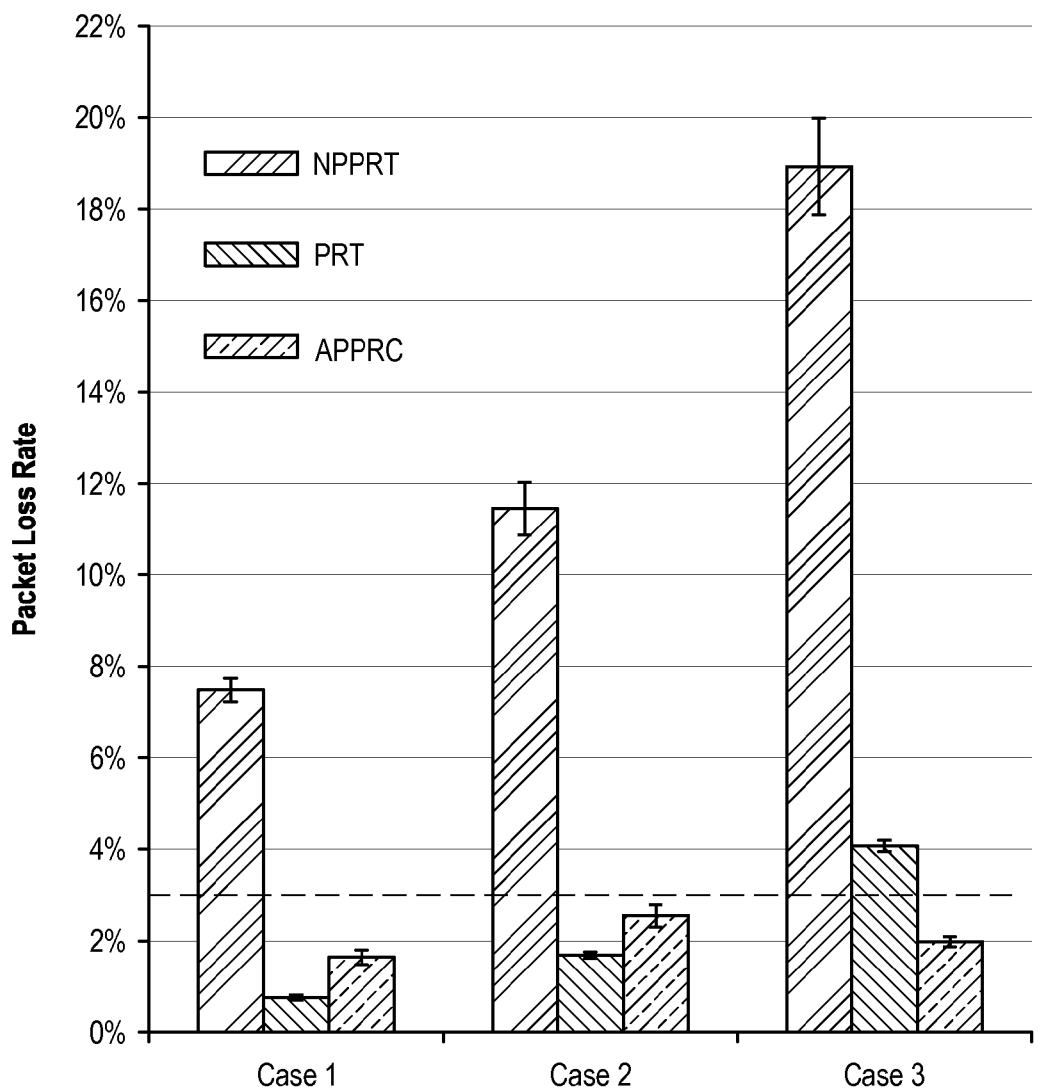
FIGS. 4a-4f depict example results in connection with operation of the example setup of FIG. 3b.
Figure 4B:
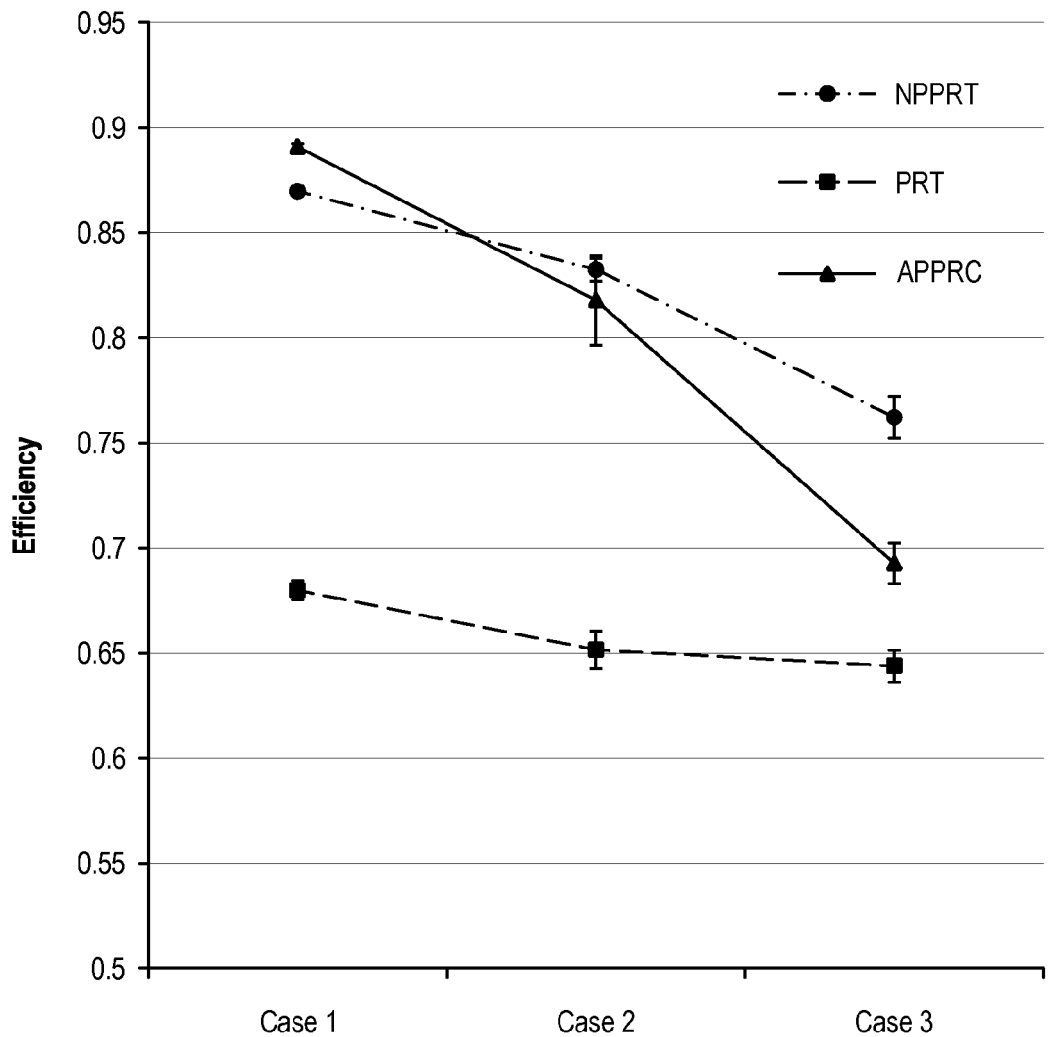
Figure 4C:
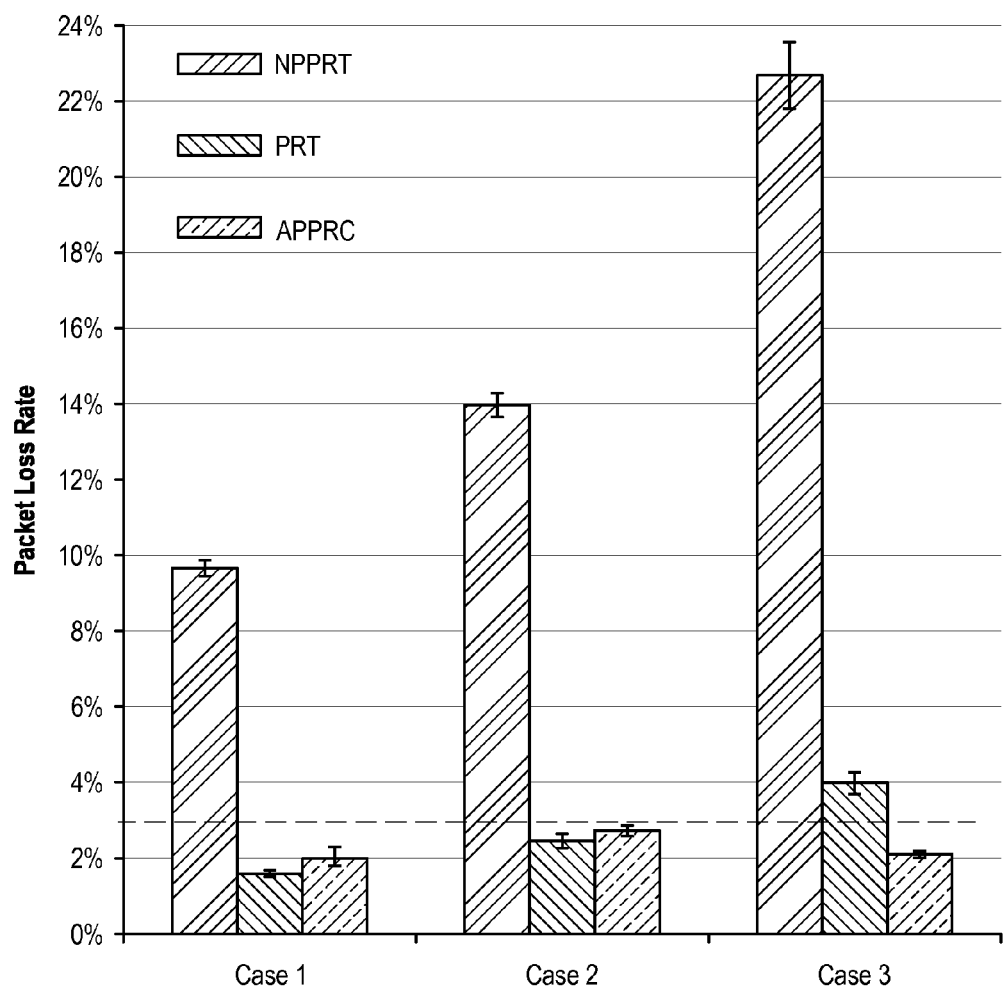
Figure 4D:
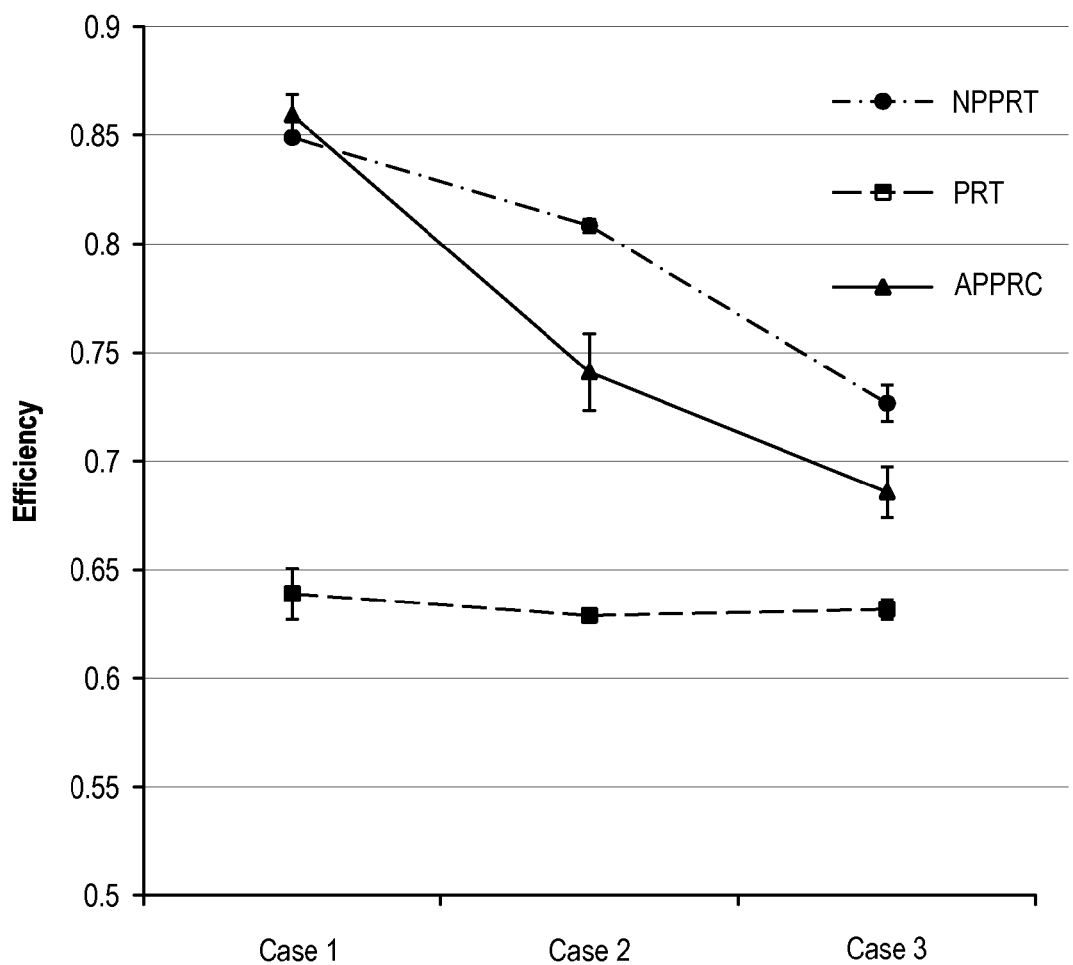
Figure 4E:
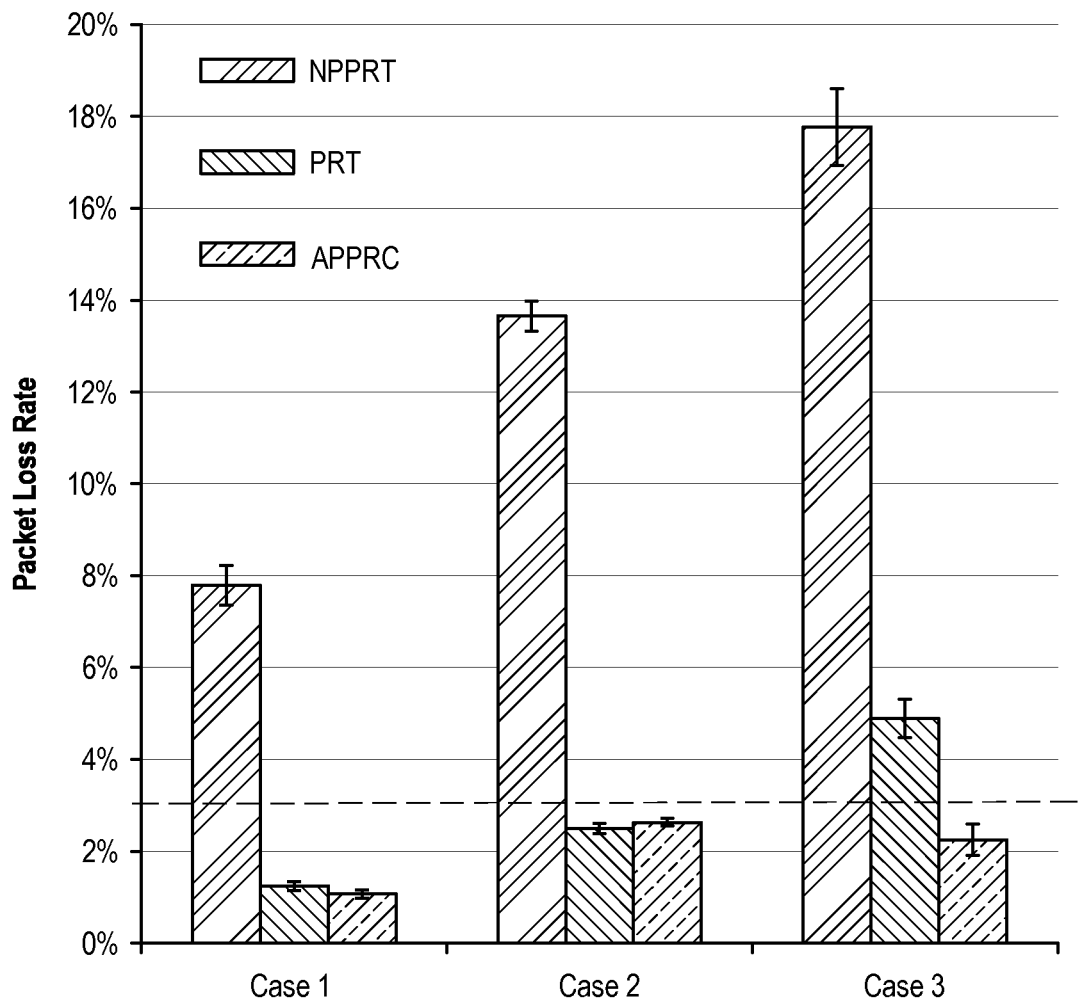
Figure 4F:
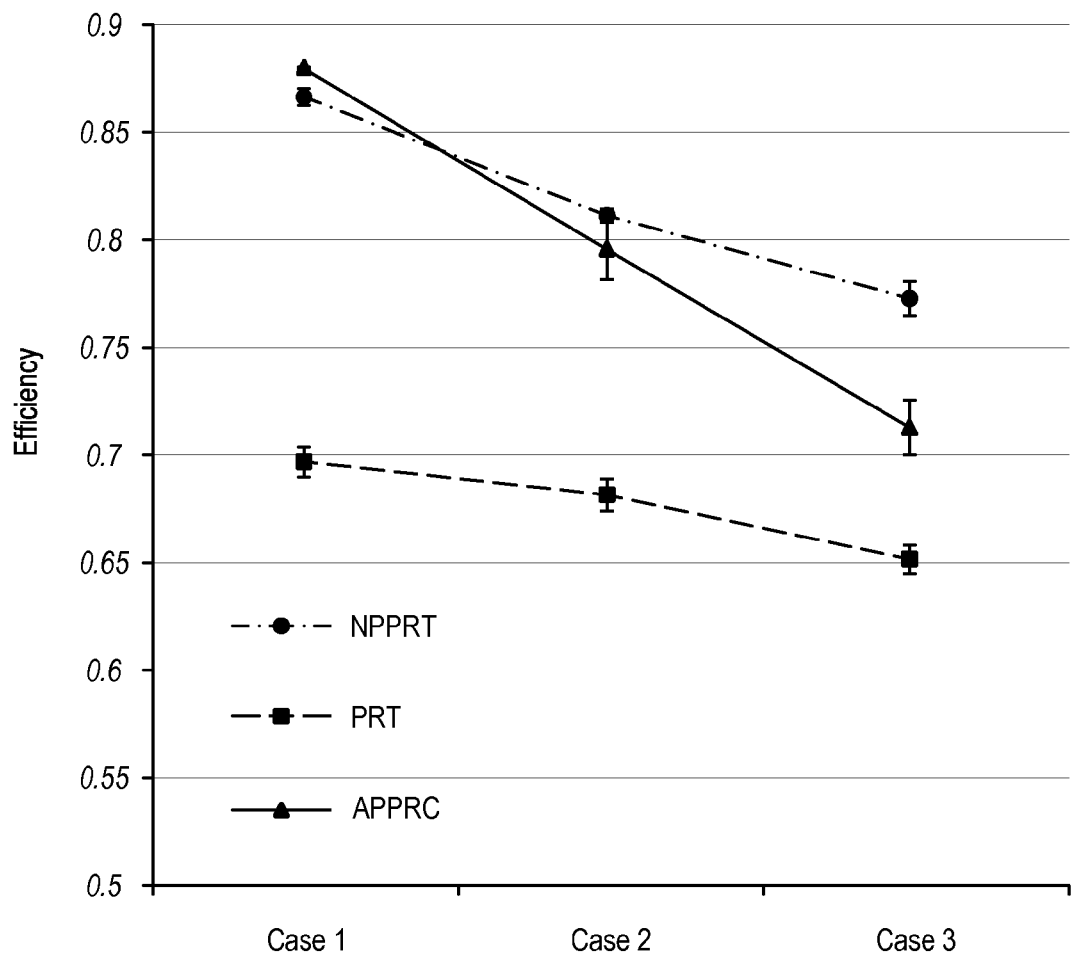

FIGS. 4a-4f may be divided into a first set including FIGS. 4a and 4b, a second set including FIGS. 4c and 4d, and a third set including FIGS. 4e and 4f. In each of the first, second, and third sets, a packet loss rate (PLR) and efficiency may be measured. The efficiency as used with reference to FIGS. 4a-4f may generally refer to a ratio of effective PHY payload received to a total data transmitted. In the example results of FIGS. 4a-4f, the efficiency may be determined according to an example transmission efficiency equation:

$$E = \frac{(1 - P_L) \cdot N_p \cdot L_{PSDU} / L_z}{N_{Total}}$$

In the transmission efficiency equation, a variable E represents the efficiency. A variable $L_Z$ represents a ZigBee packet length. A variable $L_{PSDU}$ represents the PHY payload. A variable $P_L$ represents the PLR. A variable $N_P$ represents a number of packets to be transmitted. A variable $N_{Total}$ represents a total number of packets transmitted including the retransmitted packets.

In each of the first, second, and third sets, the PLR and the efficiency is provided for each of Case 1, Case 2, and Case 3 under three scenarios: no preamble padding or packet retransmission (NPPRT), MaxRetries set to 1 (PRT), and adaptive preamble padding with retransmission control (APPRC).

In FIGS. 4a and 4b, a distributed internet traffic generator (D-ITG) (not shown) may generate interfering user datagram protocol (UDP) traffic with packet payload size of 1400 bytes and constant packet rate of 500 packets per second (packets/s), which may then be converted to IEEE 802.11g Wi-Fi interference by the WR 406.

As illustrated in FIGS. 4a and 4b, ZigBee client motes 404a-404c transmitting without either preamble padding or packet retransmission (e.g., the NPPRT scenario) may have the worst PLR. The NPPRT does not provide a sufficient App PLR, which is set at about 3%, for instance. In the three cases, APPRC maintains the PLR to be lower than 3%, for instance. Although in Cases 1 and 2, the PRT scenario has better PLR than APPRC, FIG. 4b illustrates that APPRC may achieve higher transmission efficiency than PRT. When compared to NPPRT in Case 1, APPRC has better PLR and exceeds NPPRT in transmission efficiency. This may be because although APPRC adds more protective bytes to the packet preamble, it achieves considerably higher successful packet delivery than NPPRT. In Case 3, PRT with one retransmission may only achieve a PLR of about 4%, for instance, while APPRC has better PLR but also may achieve higher transmission efficiency than PRT. Increasing PRT's MaxRetries (e.g., to two or more) may further reduce its PLR for meeting the PLR requirement of 3%, for instance, but may also worsen the transmission efficiency.

On the other hand, APPRC may use preamble adjustment to satisfy the PLR requirement whenever possible and may adopt packet retransmission to further reduce PLR when preamble adjustment alone may not meet the PLR requirement. By using both preamble padding and packet retransmission, APPRC may achieve a lower PLR than PRT. In addition, by using preamble padding, APPRC may achieve better successful packet delivery rate for original and retransmitted packets, thus resulting in less retransmissions and higher transmission efficiency. Accordingly, APPRC may be able to reduce the PLR in a more efficient way than the PRT.

FIGS. 4c and 4d depict example results from a configuration in which the D-ITG is set to generate UDP packet sequences having constant packet inter-departure time (IDT) at a rate of 800 packets/s and packet payload sizes following the Uniform distribution between 900 to 1400 bytes, for instance. The interfering Wi-Fi traffic 314 may be heavier than in FIGS. 4a and 4b, thus resulting in more packet losses and reduced transmission efficiency in the three cases as compared to FIGS. 4a and 4b. APPRC may satisfy the App PLR in all the cases and may achieve much better performance than NPPRT and PRT. Compared to NPPRT, APPRC may achieve substantial improvement in PLR at some expense (only in Cases 2 and 3) of transmission efficiency. Compared to PRT, APPRC may achieve better transmission efficiency.

FIGS. 4e and 4f depict example results pertaining to the effectiveness of APPRC under changing Wi-Fi interference. In each of the examples, D-ITG may first generate interfering UDP traffic with packet payload size of 900 bytes per packet (bytes/packet) at 500 packets/s for instance, and may change to 1400 bytes/packet at 800 packets/s for instance. For example, the WR 406 may transmit traffic including an equal combination of two traffic patterns, with UDP packet payload size of 900 bytes/packet and packet rate of 500 packets/s, and then may change to 1400 bytes/packet and 800 packets/s. FIGS. 4e and 4f show that APPRC may deal with the varying interference well and may maintain high transmission efficiency while satisfying the App PLR.

From FIGS. 4a-4f, it may be seen that APPRC may be effective in improving the performance of ZigBee packet transmission when there is Wi-Fi interference close by. Padding the preamble of ZigBee packets may largely prevent the ZigBee SHR and PHR from being corrupted by the interfering Wi-Fi packets. Although such padding bytes may introduce more overhead to the packet, the reduced number of lost packets may offset such impact and may maintain high transmission efficiency. Generally, preamble padding may be more efficient than packet retransmission in reducing PLR. In a case when ZigBee packet transmission is experiencing severe interference and preamble padding alone may not satisfy the App PLR, packet retransmission may be adopted. APPRC may efficiently adapt to the changing interference by determining the number of protective bytes for preamble padding adaptively and whether or not to adopt packet retransmission. Therefore, APPRC may improve ZigBee packet transmission efficiency by using preamble padding whenever possible, and may further reduce PLR by adopting packet retransmission when appropriate.

Figure 5A:
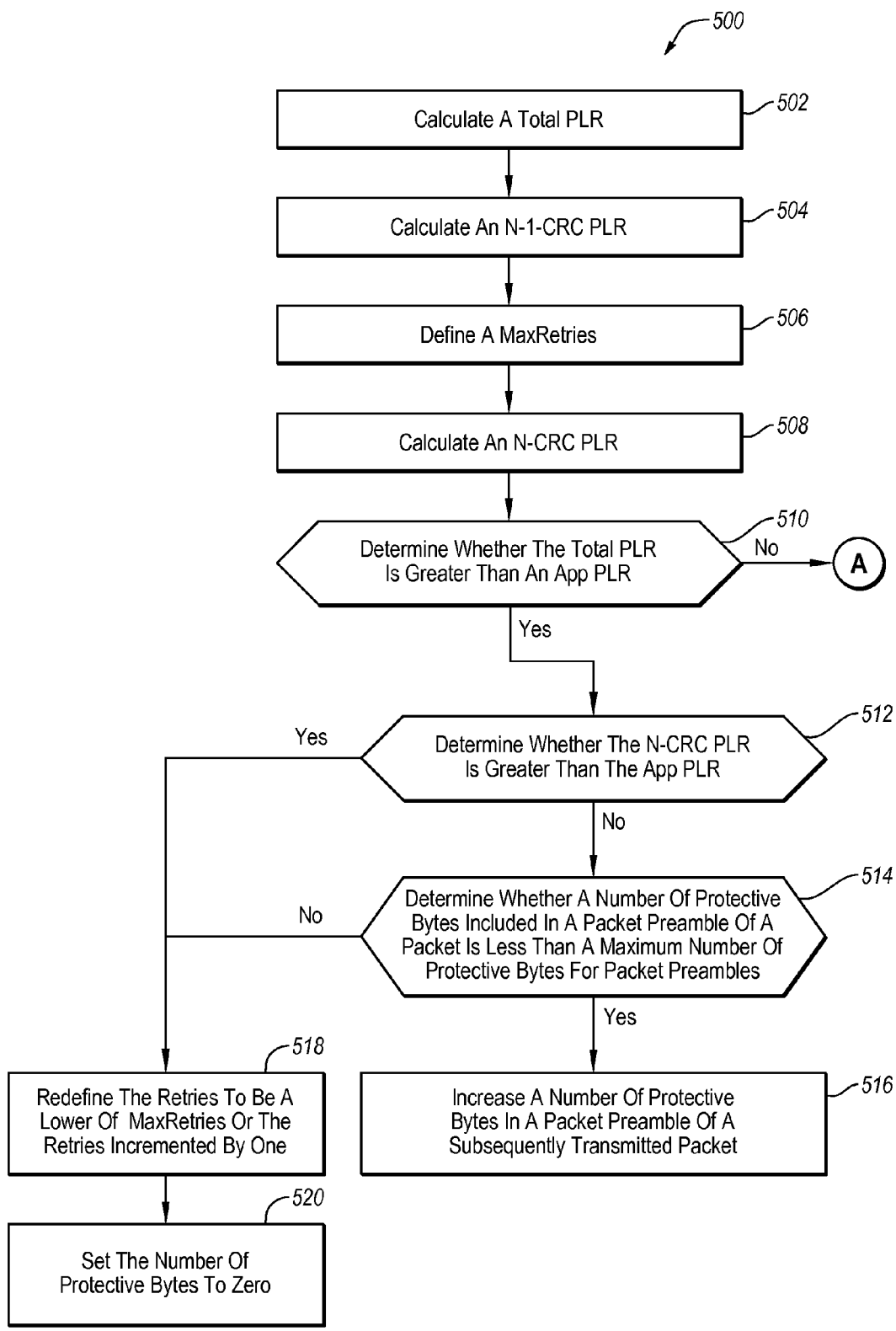
FIGS. 5a-5c show a flow diagram of an example packet preamble adjustment method.
Figure 5B:
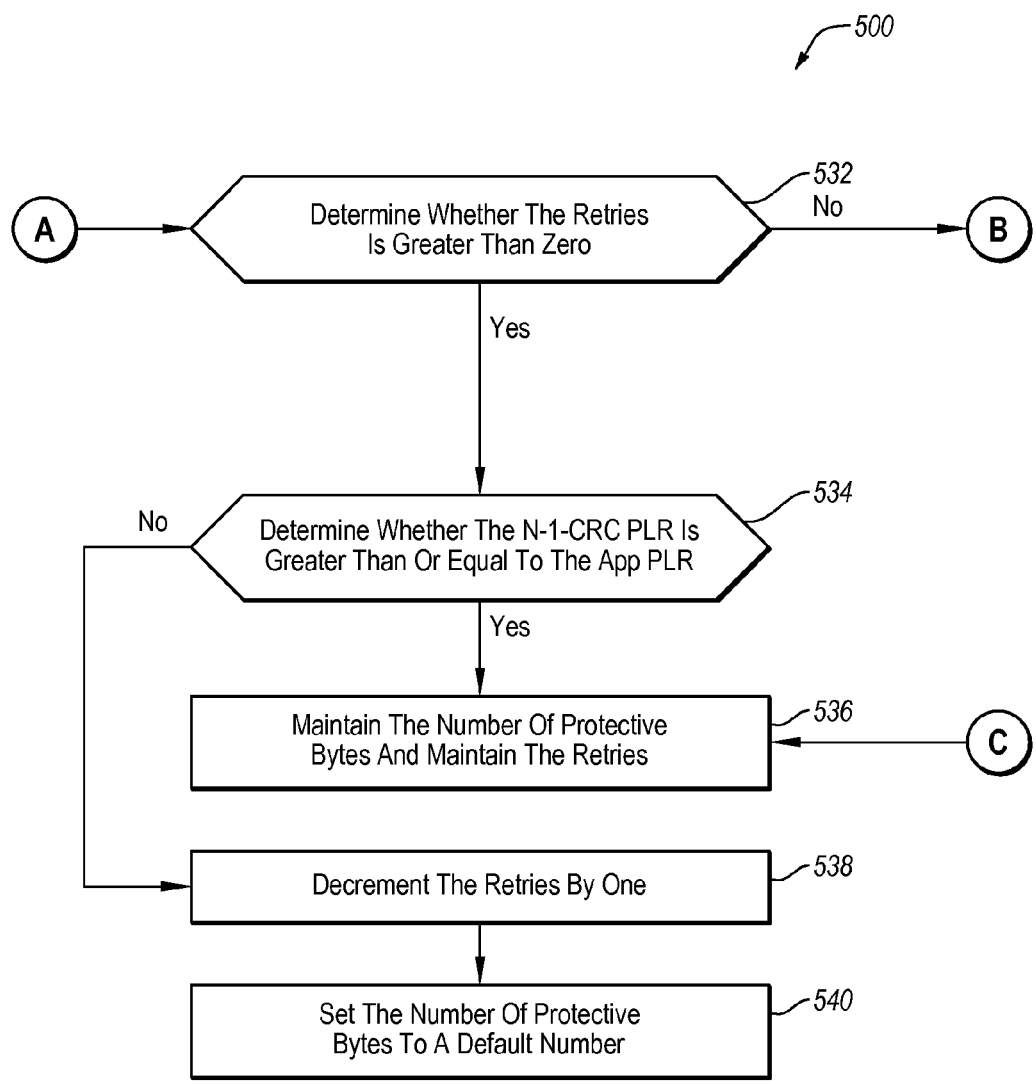
Figure 5C:
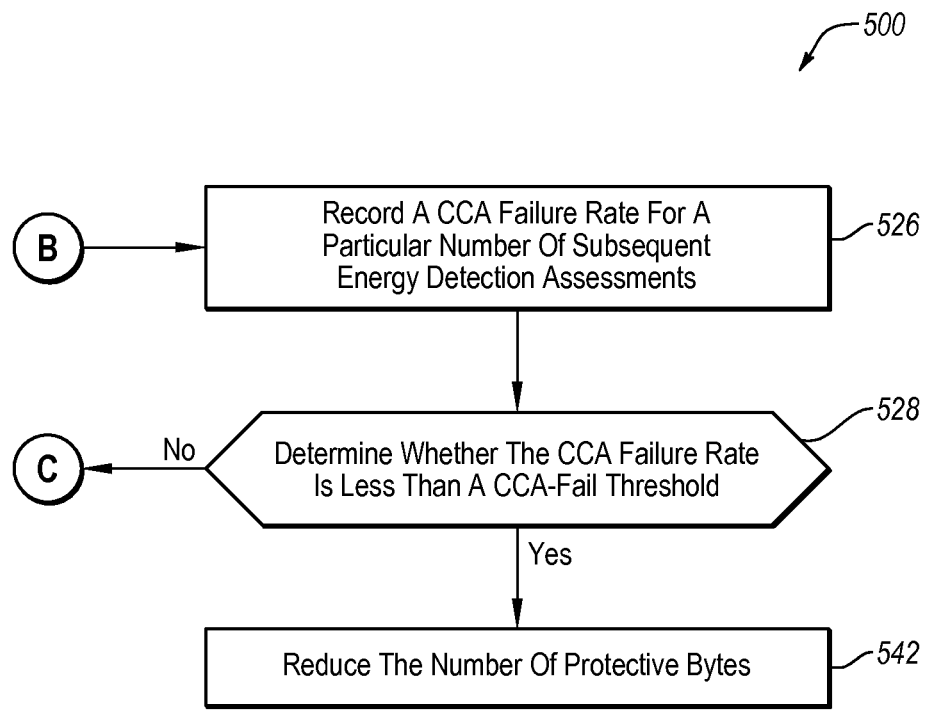

FIGS. 5a-5c show a flow diagram of an example preamble adjustment method 500, arranged in accordance with at least some embodiments described herein. The method 500 may be performed, for example, in the operating environment 100 of FIG. 1, and/or the ZigBee/Wi-Fi operating environments 300 and 400 of FIGS. 3a and 3b, and/or in other operating environments and configurations. For example, one or more of the first node 106a, the second node 106b, the first ZigBee mote 306a, and/or the second ZigBee mote 306b may include a preamble adjustment module that may be configured to perform the method 500.

The method 500 (including the operations in the various blocks described below) may be performed in some embodiments by the packet adjustment module 112 that may be included in a computing device such as the first apparatus 200 of FIG. 2. In some embodiments, the computing device may include or may be communicatively coupled to one or more non-transitory computer-readable media having thereon computer-readable instructions, which in response to execution by one or more processors, cause the one or more processors to perform or control performance of the method 500. The packet adjustment module 112 in some embodiments may be implemented by such computer-readable instructions stored on one or more non-transitory computer-readable media (such as a memory) and executable by one or more processors (such as a processor at a transmit node/device). Although illustrated as discrete blocks, various blocks may be divided into additional blocks, supplemented with additional blocks, combined into fewer blocks, or eliminated, depending on the particular implementation.

With reference to FIG. 5a, the method 500 may begin at block 502. At block 502 ("Calculate A Total PLR"), a Total PLR may be calculated. At block 504 ("Calculate An N−1-CRC PLR"), an N−1-CRC PLR may be calculated. At block 506 ("Define A MaxRetries"), a MaxRetries may be defined. At block 508 ("Calculate An N-CRC PLR"), an N-CRC PLR may be calculated.

At block 510 ("Determine Whether The Total PLR Is Greater Than An App PLR"), it may be determined whether the Total PLR is greater than an App PLR. In response to the Total PLR being greater than the App PLR ("Yes" at block 510), the method 500 may proceed to block 512. At block 512 ("Determine Whether The N-CRC PLR Is Greater Than The App PLR") it may be determined whether the N-CRC PLR is greater than the App PLR. In response to the N-CRC PLR being less than or equal to the App PLR ("No" at block 512), the method 500 may proceed to block 514. At block 514 ("Determine Whether A Number Of Protective Bytes Included In A Packet Preamble Of A Packet Is Less Than A Maximum Number Of Protective Bytes For Packet Preambles"), it may be determined whether a number of protective bytes included in a packet preamble of a packet is less than a maximum number of protective bytes for packet preambles. In response to the number of protective bytes included in a packet preamble being less than a maximum number of protective bytes for packet preambles ("Yes," at 514), the method 500 may proceed to block 516. At block 516 ("Increase A Number Of Protective Bytes In A Packet Preamble Of A Subsequently Transmitted Packet"), a number of protective bytes in a packet preamble of a subsequently transmitted packet may be increased.

In response to the N-CRC PLR being greater than the App PLR ("Yes" at block 512) and/or in response to the number of protective bytes included in a packet preamble being equal to a maximum number of protective bytes for packet preambles ("No" at block 514), the method 500 may proceed to block 518. At block 518 ("Redefine The Retries To Be A Lower Of The MaxRetries Or The Retries Incremented By One") the Retries may be redefined to be a lower of the MaxRetries or the Retries incremented by one. At block 520 ("Set The Number Of Protective Bytes To Zero"), the number of protective bytes may be set to zero such that the packet preamble includes a default number of bytes.

In response to the Total PLR being less than or equal to the App PLR ("No" at block 510), the method 500 may proceed to block 532 of FIG. 5b. Referring to FIG. 5b, at block 532 ("Determine Whether The Retries Is Greater Than Zero"), it may be determined whether the Retries is greater than zero.

In response to the Retries being greater than zero ("Yes" at block 532), the method 500 may proceed to block 534. At block 534 ("Determine Whether The N−1-CRC PLR Is Greater Than or Equal to The App PLR") it may be determined whether the N−1-CRC PLR is greater than or equal to the App PLR. In response to the N−1-CRC PLR being greater than or equal to the App PLR ("Yes" at block 534), the method 500 may proceed to block 536. At block 536 ("Maintain The Number Of Protective Bytes And Maintain The Retries"), the number of protective bytes and the Retries may be maintained. In response to the N−1-CRC PLR being less than the App PLR ("No" at block 534), the method 500 may proceed to block 538. At block 538 ("Decrement The Retries By One"), the Retries may be decremented by one. At block 540 ("Set The Number Of Protective Bytes To A Default Number"), the number of protective bytes may be set to a default number such as eight.

In response to the Retries being equal to zero ("No" at block 532), the method 500 may proceed to block 526 of FIG. 5c. With reference to FIG. 5c, at block 526 ("Record A CCA Failure Rate For A Particular Number Of Subsequent Energy Detection Assessments"), a CCA failure rate may be recorded for a particular number of subsequent ED assessments. At block 528 ("Determine Whether The CCA Failure Rate Is Less Than A CCA-Fail Threshold"), it may be determined whether the CCA failure rate is less than a CCA-Fail Threshold. In response to the CCA failure rate being greater than or equal to a CCA-Fail Threshold ("No" at 528), the method 500 may proceed to block 536 discussed above. In response to the CCA failure rate being less than a CCA-Fail Threshold ("Yes" at 528), the method 500 may proceed to block 542. At block 542, ("Reduce The Number Of Protective Bytes"), the number of protective bytes included in subsequent packet preambles may be reduced.

The method 500 may further proceed through one or more of blocks 502, 504, 506, 508, 510, 512, 514, 516, 518, 520, 526, 528, 532, 534, 536, 538, 540, and 542 using recalculated values of the Total PLR, the N−1-CRC PLR, the N-CRC PLR, or some combination thereof.

For this and other procedures and methods disclosed herein, the functions or operations performed in the processes and methods may be implemented in differing order. Furthermore, the outlined operations are only provided as examples, and some of the operations may be optional, combined into fewer operations, supplemented with other operations, or expanded into additional operations without detracting from the disclosed embodiments.

Figure 6:
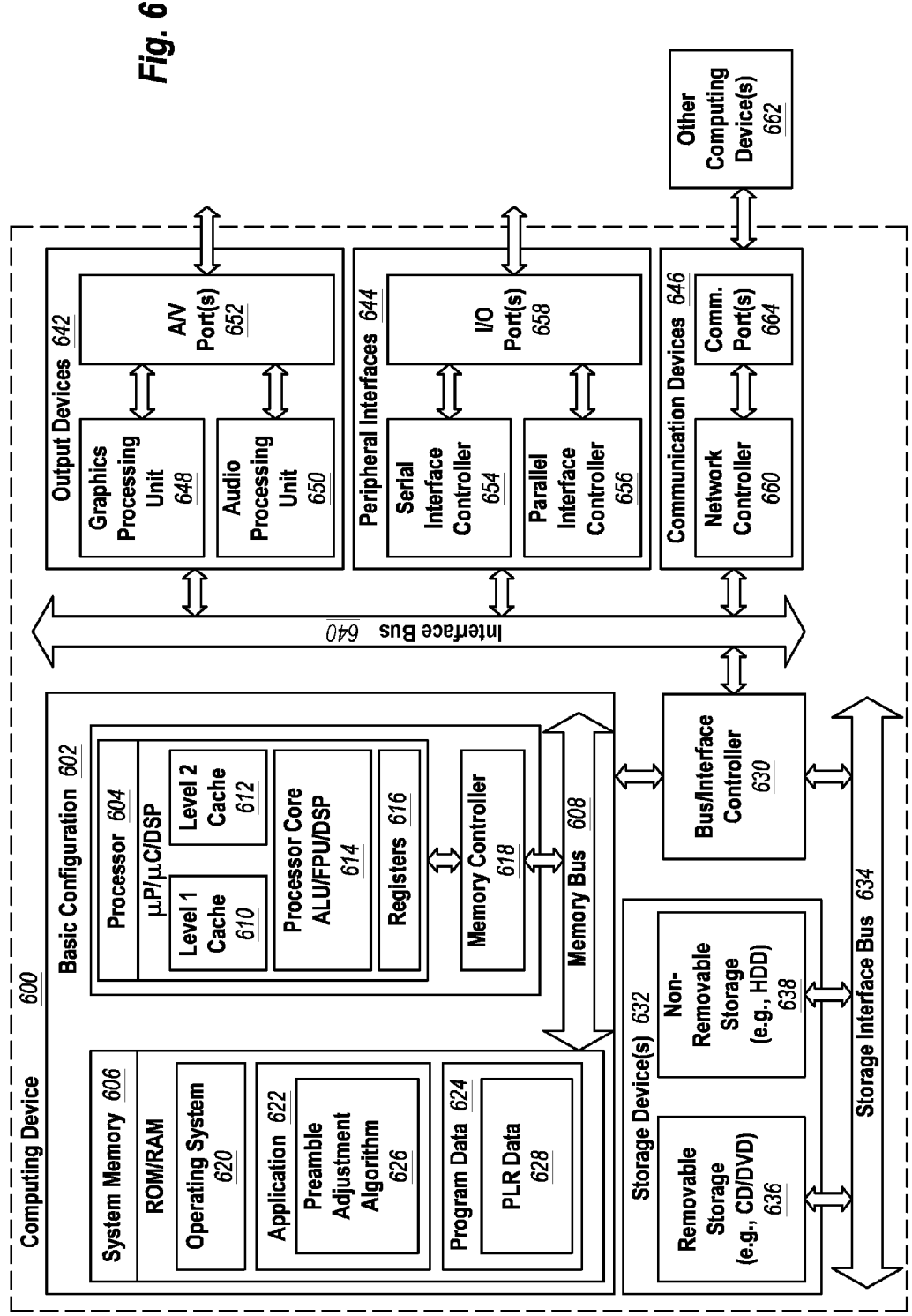
FIG. 6 is a block diagram illustrating an example computing device that is arranged to adjust a packet preamble, all arranged in accordance with at least some embodiments described herein.

FIG. 6 is a block diagram illustrating an example computing device 600 that is arranged to adjust a packet preamble, arranged in accordance with at least some embodiments described herein. The computing device 600 may be used in some embodiments to implement the first node 106a, the second node 106b, the first apparatus 200, the various motes described above, and/or any other device that is capable to provide the features and operations described herein that pertain to preamble adjustment. In a basic configuration 602, the computing device 600 typically includes one or more processors 604 and a system memory 606. A memory bus 608 may be used for communicating between the processor 604 and the system memory 606.

Depending on the desired configuration, the processor 604 may be of any type including, but not limited to, a microprocessor (μP), a microcontroller (μC), a digital signal processor (DSP), or any combination thereof. The processor 604 may include one or more levels of caching, such as a level one cache 610 and a level two cache 612, a processor core 614, and registers 616. The processor core 614 may include an arithmetic logic unit (ALU), a floating point unit (FPU), a digital signal processing core (DSP core), or any combination thereof. An example memory controller 618 may also be used with the processor 604, or in some implementations, the memory controller 618 may be an internal part of the processor 604.

Depending on the desired configuration, the system memory 606 may be of any type including, but not limited to, volatile memory (such as RAM), nonvolatile memory (such as ROM, flash memory, etc.), or any combination thereof. The system memory 606 may include an operating system 620, one or more applications 622, and program data 624. The application 622 may include a preamble adjustment algorithm 626 that is arranged to reduce corruption of packets due to turnaround time collisions, e.g., when the computing device 600 is operable as a transmit device of one or more data packets to a receive device. The program data 624 may include values for the Retries and/or the MaxRetries, the App PLR, CCA-Fail Thresholds, default values for a number of protective bytes included in packet preambles, or any combination thereof (collectively "PLR Data 628" in FIG. 6) as is described herein. In some embodiments, the application 622 may be arranged to operate with the program data 624 on the operating system 620 such that packet preambles may be adjusted according to one or more packet loss rates.

The computing device 600 may have additional features or functionality, and additional interfaces to facilitate communications between the basic configuration 602 and any required devices and interfaces. For example, a bus/interface controller 630 may be used to facilitate communications between the basic configuration 602 and one or more data storage devices 632 via a storage interface bus 634. The data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 606, the removable storage devices 636, and the non-removable storage devices 638 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., output devices 642, peripheral interfaces 644, and communication devices 646) to the basic configuration 602 via the bus/interface controller 630. The output devices 642 include a graphics processing unit 648 and an audio processing unit 650, which may be configured to communicate to various external devices such as a display or speakers via one or more A/V ports 652. The peripheral interfaces 644 include a serial interface controller 654 or a parallel interface controller 656, which may be configured to communicate with external devices such as input devices (e.g., keyboard, mouse, pen, voice input device, touch input device, etc.), sensors, or other peripheral devices (e.g., printer, scanner, etc.) via one or more I/O ports 658. The communication devices 646 include a network controller 660, which may be arranged to facilitate communications with one or more other computing devices 662 over a network communication link via one or more communication ports 664.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 600 may be implemented as a portion of a small-form factor portable (or mobile) electronic device such as a cell phone, a personal data assistant (PDA), a personal media player device, a wireless web-watch device, a personal headset device, an application-specific device, or a hybrid device that includes any of the above functions. The computing device 600 may also be implemented as a personal computer including both laptop computer and non-laptop computer configurations.

The present disclosure is not to be limited in terms of the particular embodiments described herein, which are intended as illustrations of various aspects. Many modifications and variations can be made without departing from its spirit and scope. Functionally equivalent methods and apparatuses within the scope of the disclosure, in addition to those enumerated herein, will be apparent from the foregoing descriptions. Such modifications and variations are intended to fall within the scope of this disclosure. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various embodiments of the present disclosure have been described herein for purposes of illustration, and various modifications may be made without departing from the scope and spirit of the present disclosure. Accordingly, the various embodiments disclosed herein are not intended to be limiting.

What is claimed is:

1. An apparatus usable in a first network and that is configurable to operate within a proximity of a second network that communicates traffic that interferes with data communication in the first network, the apparatus comprising:
   a calculation module configured to calculate a packet loss rate;
   a determination module coupled to the calculation module and configured to determine whether the packet loss rate exceeds a particular threshold level; and
   a preamble module coupled to the determination module and configured to:
      add protective bytes in preambles of packets communicated in the first network, wherein:
         the protective bytes collide with the traffic communicated in the second network, and reduce corruption of the packets during collisions between the packets communicated in the first network and the traffic communicated in the second network,
         the collisions occur in a turnaround time, and
         the turnaround time includes a time between energy detection of a channel and a start of a transmission of the packets;
      dynamically adjust a number of the protective bytes added in the preambles of the packets, in response to a determination by the determination module that the packet loss rate exceeds the particular threshold level; and
      reduce the number of protective bytes added in the preambles of the packets in response to a determination that a maximum number of packet retransmission attempts allowed after a packet transmission failure (Retries) is equal to zero and a determination by the determination module that the packet loss rate is less than the particular threshold level.

2. The apparatus of claim 1, wherein the preamble module is configured to increase the number of protective bytes in the preambles of the packets, in response to the determination that the packet loss rate exceeds the particular threshold level.

3. The apparatus of claim 1, further comprising a transmission monitor module coupled to the determination module and configured to:
   increment the maximum number of packet retransmission attempts allowed after a packet transmission failure, based at least partially on the determination by the determination module that the packet loss rate exceeds the particular threshold level; and
   decrement the maximum number of packet retransmission attempts allowed after the packet transmission failure, based at least partially on a determination by the determination module that the packet loss rate falls below the particular threshold level.

4. The apparatus of claim 1, wherein the calculation module is further configured to calculate a total packet loss rate over a period of time (Total PLR), a packet loss rate due to cyclic redundancy check errors after a total number of transmission attempts allowed to send a packet (N-CRC PLR), and a packet loss rate due to cyclic redundancy check errors after the total number of transmission attempts allowed to send the packet reduced by one (N−1-CRC PLR), and wherein the total number of transmission attempts allowed to send the packet is equal to one greater than the maximum number of packet retransmission attempts allowed after a packet transmission failure (Retries).

5. An apparatus usable in a first network and that is configurable to operate within a proximity of a second network that communicates traffic that interferes with data communication in the first network, the apparatus comprising:
   a calculation module configured to calculate a packet loss rate;
   a determination module coupled to the calculation module and configured to determine whether the packet loss rate exceeds a particular threshold level;
   a preamble module coupled to the determination module and configured to dynamically adjust a number of protective bytes included in preambles of packets, in response to a determination, by the determination module, that the packet loss rate exceeds the particular threshold level, wherein the protective bytes are effective to reduce corruption of the packets due to turn-around time collisions between packets communicated in the first network and the traffic communicated in the second network; and
   a transmission monitor module coupled to the determination module and configured to:
      increment a maximum number of packet retransmission attempts allowed after a packet transmission failure, based at least partially on the determination by the determination module, that the packet loss rate exceeds the particular threshold level; and
      decrement the maximum number of packet retransmission attempts allowed after the packet transmission failure, based at least partially on a determination by the determination module, that the packet loss rate falls below the particular threshold level, wherein:
      the calculation module is further configured to calculate a clear channel assessment (CCA) failure rate for a particular number of energy detection assessments subsequent to packet retransmission being disabled,
      the determination module is further configured to determine whether the clear channel assessment failure rate is lower than a particular clear channel assessment threshold (CCA-Fail Threshold), and
the preamble module is further configured to reduce the number of protective bytes added in the preambles of the packets in response to a determination, by the determination module, that the clear channel assessment failure rate is lower than the particular clear channel assessment threshold.

6. An apparatus usable in a first network and that is configurable to operate within a proximity of a second network that communicates traffic that interferes with data communication in the first network, the apparatus comprising:
a calculation module configured to calculate a packet loss rate;
a determination module coupled to the calculation module and configured to determine whether the packet loss rate exceeds a particular threshold level; and
a preamble module coupled to the determination module and configured to dynamically adjust a number of protective bytes included in preambles of packets, in response to a determination, by the determination module, that the packet loss rate exceeds the particular threshold level, wherein the protective bytes are effective to reduce packet corruption due to turnaround time collisions between packets communicated in the first network and the traffic communicated in the second network,
wherein the calculation module is further configured to calculate a total packet loss rate over a period of time (Total PLR), a packet loss rate due to cyclic redundancy check errors after a total number of transmission attempts allowed to send a packet (N-CRC PLR), and a packet loss rate due to cyclic redundancy check errors after the total number of transmission attempts allowed to send the packet reduced by one (N−1-CRC PLR), wherein the total number of transmission attempts allowed to send the packet is equal to one greater than a maximum number of packet retransmission attempts allowed after a packet transmission failure, and
wherein:
the determination module is further configured to determine whether the packet loss rate due to cyclic redundancy check errors after the total number of transmission attempts allowed to send a packet is greater than the particular threshold level, to determine whether the number of protective bytes included in the preambles of the packets is less than a maximum number of protective bytes for the preambles of the packets, and to determine whether the packet loss rate due to cyclic redundancy check errors after the total number of transmission attempts allowed to send the packet reduced by one is greater than or equal to the particular threshold level, and
the preamble module is further configured to:
set the number of protective bytes included in the preambles of the packets to zero in response to a determination, by the determination module, that the packet loss rate due to cyclic redundancy check errors after the total number of transmission attempts allowed to send the packet is greater than the particular threshold level or in response to a determination, by the determination module, that the number of protective bytes is equal to the maximum number of protective bytes;
maintain the number of protective bytes included in the preambles of the packets in response to a determination, by the determination module, that the packet loss rate due to cyclic redundancy check errors after the total number of transmission attempts allowed to send the packet reduced by one is greater than or equal to the particular threshold level; and
set a number of protective bytes included in the preambles of the packets to a default number, in response to a determination, by the determination module, that the packet loss rate due to cyclic redundancy check errors after the total number of transmission attempts allowed to send the packet reduced by one is less than the particular threshold level.

7. A method, comprising:
adding protective bytes in preambles of packets communicated in a first network, wherein:
the protective bytes collide with traffic communicated in a second network, and reduce corruption of the packets during collisions between the packets communicated in the first network and the traffic communicated in the second network,
the collisions occur in a turnaround time, and
the turnaround time includes a time between energy detection of a channel and starting of a packet transmission;
calculating a total packet loss rate over a period of time (Total PLR);
determining whether the total packet loss rate over the period of time is greater than a maximum tolerable packet loss rate associated with an application (App PLR);
in response to the total packet loss rate over the period of time being greater than the maximum tolerable packet loss rate associated with the application, determining whether a number of protective bytes included in the preambles of the packets is less than a maximum number of protective bytes for the preambles of the packets;
in response to the number of protective bytes being less than the maximum number of protective bytes, increasing a number of protective bytes in a preamble of a subsequently transmitted packet; and
reducing the number of protective bytes added in the preambles of the packets in response to a determination that a maximum number of packet retransmission attempts allowed after a packet transmission failure (Retries) is equal to zero and a determination by the determination module that the packet loss rate is less than a particular threshold level.

8. A non-transitory computer-readable medium that includes computer-readable instructions stored thereon, which in response to execution by a processor, cause the processor to perform or cause the processor to control performance of the method of claim 7.

9. A method, comprising:
calculating a total packet loss rate over a period of time (Total PLR);
determining whether the total packet loss rate over the period of time is greater than a maximum tolerable packet loss rate associated with an application (App PLR);
in response to the total packet loss rate over the period of time being greater than the maximum tolerable packet loss rate associated with the application, determining whether a number of protective bytes included in preambles of packets is less than a maximum number of protective bytes for the preambles of the packets;

in response to the number of protective bytes being less than the maximum number of protective bytes, increasing a number of protective bytes in a preamble of a subsequently transmitted packet;
calculating a packet loss rate due to cyclic redundancy check errors after a total number of transmission attempts allowed to send a packet (N-CRC PLR), wherein the total number of packet transmission attempts allowed to send the packet is equal to a sum of one and a retries variable (Retries) indicative of a maximum number of packet retransmission attempts allowed after a packet transmission failure;
defining a maximum value of retries variable (MaxRetries) at which the retries variable stops increasing;
in response to the total packet loss rate over the period of time being greater than the maximum tolerable packet loss rate associated with the application, determining whether the packet loss rate due to cyclic redundancy check errors after the total number of transmission attempts allowed to send the packet is greater than the maximum tolerable packet loss rate associated with the application; and
in response to the packet loss rate due to cyclic redundancy check errors after the total number of transmission attempts allowed to send the packet being greater than the maximum tolerable packet loss rate associated with the application or in response to the number of protective bytes being equal to the maximum number of protective bytes, redefining the retries variable to be a lower of the maximum value of the retries variable or the retries variable incremented by one, and setting the number of protective bytes to zero.

10. The method of claim 9, further comprising:
recalculating the Total PLR and the N-CRC PLR;
determining whether the recalculated Total PLR is greater than the App PLR;
in response to the recalculated Total PLR being greater than the App PLR, determining whether the recalculated N-CRC PLR is greater than the App PLR;
in response to the recalculated N-CRC PLR being greater than the App PLR, redefining the Retries to be a lower of the MaxRetries or the Retries incremented by one, and setting the number of protective bytes to zero;
in response to the recalculated N-CRC PLR being equal to or less than the App PLR, determining whether the number of protective bytes is less than the maximum number of protective bytes;
in response to the number of protective bytes being less than the maximum number of protective bytes, increasing the number of protective bytes for a subsequent transmission of the packet and maintaining the Retries; and
in response to the number of protective bytes being equal to the maximum number of protective bytes, redefining the Retries to be a lower of the MaxRetries or the Retries incremented by one, and setting the number of protective bytes to zero.

11. The method of claim 9, further comprising:
in response to the Total PLR being less than or equal to the App PLR, determining whether the Retries is greater than zero;
in response to the Retries being greater than zero, calculating a packet loss rate due to cyclic redundancy check errors for the Retries (N−1-CRC PLR);
determining whether the N−1-CRC PLR is greater than or equal to the App PLR;

in response to the N−1-CRC PLR being greater than or equal to the App PLR, maintaining the number of protective bytes and maintaining the Retries; and
in response to the N−1-CRC PLR being less than the App PLR:
setting the number of protective bytes to a default number, and
decrementing the Retries by one.

12. The method of claim 11, wherein:
reducing the number of protective bytes includes one or more of reducing the number of protective bytes from 13 bytes to 8 bytes, reducing the number of protective bytes from 8 bytes to 4 bytes, and reducing the number of protective bytes from 4 bytes to 0 bytes,
increasing the number of protective bytes includes one or more of increasing the number of protective bytes from 0 bytes to 4 bytes, increasing the number of protective bytes from 4 bytes to 8 bytes, and increasing the number of protective bytes from 8 bytes to 13 bytes, and
the default number of protective bytes of the preambles of the packets substantially complies with Institute of Electrical and Electronics Engineers (IEEE) 802.15.4 standard.

13. A method, comprising:
calculating a total packet loss rate over a period of time (Total PLR);
determining whether the total packet loss rate over the period of time is greater than a maximum tolerable packet loss rate associated with an application (App PLR);
in response to the total packet loss rate over the period of time being greater than the maximum tolerable packet loss rate associated with the application, determining whether a number of protective bytes included in preambles of packets is less than a maximum number of protective bytes for the preambles of the packets;
in response to a the number of protective bytes being less than the maximum number of protective bytes, increasing a number of protective bytes in a preamble of a subsequently transmitted packet;
in response to the total packet loss rate over the period of time being less than or equal to the maximum tolerable packet loss rate associated with the application, determining whether a retries variable (Retries) indicative of a maximum number of packet retransmission attempts allowed after a packet transmission failure is greater than zero; and
in response to the retries variable not being greater than zero:
recording a clear channel assessment (CCA) failure rate for a particular number of subsequent energy detection assessments;
determining whether the clear channel assessment failure rate is lower than a particular clear channel assessment threshold (CCA-Fail Threshold);
in response to the clear channel assessment failure rate being lower than the particular clear channel assessment threshold, reducing the number of protective bytes; and
in response to the clear channel assessment failure rate being greater than or equal to the particular clear channel assessment threshold, maintaining the number of protective bytes and maintaining the retries variable.

14. A node of a first network, the node configurable to operate within a proximity of a second network that communicates traffic that interferes with data communication in the first network, the node comprising:
- a processor; and
- a non-transitory computer-readable medium coupled to the processor and that includes computer-readable instructions stored thereon, which in response to execution by the processor, cause the processor to perform or cause the processor to control performance of operations to:
  - calculate a total packet loss rate over a period of time (Total PLR);
  - calculate a packet loss rate due to cyclic redundancy check errors after a total number of transmission attempts allowed to send a packet (N-CRC PLR), wherein the total number of transmission attempts allowed to send the packet is equal to a sum of one and a retries variable (Retries) indicative of a maximum number of packet retransmission attempts allowed after a packet transmission failure;
  - define a maximum value of the retries variable (MaxRetries) at which the retries variable stops to increase; and
  - determine whether the total packet loss rate over the period of time is greater than a maximum tolerable packet loss rate associated with an application (App PLR);
  - in response to the total packet loss rate over the period of time being greater than the maximum tolerable packet loss rate associated with the application, determine whether the packet loss rate due to cyclic redundancy check errors after the total number of transmission attempts allowed to send the packet is greater than the maximum tolerable packet loss rate associated with the application;
  - in response to the packet loss rate due to cyclic redundancy check errors after the total number of transmission attempts allowed to send the packet being equal to or less than the maximum tolerable packet loss rate associated with the application, determine whether a number of protective bytes included in preambles of packets is less than a maximum number of protective bytes for the preambles of the packets;
  - in response to the number of protective bytes being less than the maximum number of protective bytes, increase the number of protective bytes in the preambles of the packets for a subsequent transmission of the packet and maintain the retries variable; and
  - in response to the packet loss rate due to cyclic redundancy check errors after the total number of transmission attempts allowed to send the packet being greater than the maximum tolerable packet loss rate associated with the application, redefine the retries variable to be a lower of the maximum value of the retries variable or the retries variable incremented by one, and set the number of protective bytes to zero.

15. The node claim 14, wherein the operations further comprise, in response to the number of protective bytes being equal to the maximum number of protective bytes:
- redefine the Retries to a lower of the MaxRetries or the Retries incremented by one; and
- set the number of protective bytes to zero.

16. The node of claim 15, wherein the operations further comprise:
- in response to the Total PLR being less than or equal to the App PLR, determine whether the Retries is greater than zero;
- in response to the Retries not being greater than zero:
  - record a clear channel assessment (CCA) failure rate for a particular number of subsequent energy detection assessments;
  - determine whether the CCA failure rate is lower than a particular clear channel assessment threshold (CCA-Fail Threshold);
  - in response to the CCA failure rate being lower than the CCA-Fail Threshold, reduce the number of protective bytes; and
  - in response to the CCA failure rate being greater than or equal to the CCA-Fail Threshold, maintain the number of protective bytes and maintain the Retries; and
- in response to the Retries being greater than zero:
  - calculate a packet loss rate due to cyclic redundancy check errors for the Retries (N−1-CRC PLR);
  - determine whether the N−1-CRC PLR is greater than or equal to the App PLR;
  - in response to the N−1-CRC PLR being greater than or equal to the App PLR, maintain the number of protective bytes and maintain the Retries; and
  - in response to the N−1-CRC PLR being less than the App PLR, set the number of protective bytes to a default number and decrement the Retries by one.

17. The node of claim 14, wherein the processor comprises part of a ZigBee mote.

18. The node of claim 14, wherein the first network and the second network communicate by use of different communication standards.

19. The node of claim 14, wherein the first network and the second network communicate by use of a single common communication standard.

20. The node of claim 14, wherein the second network comprises a wireless local area network (WLAN) and the first network comprises a ZigBee network.

* * * * *

UNITED STATES PATENT AND TRADEMARK OFFICE
CERTIFICATE OF CORRECTION

PATENT NO. : 9,813,931 B2  
APPLICATION NO. : 14/446155  
DATED : November 7, 2017  
INVENTOR(S) : Makrakis et al.

Page 1 of 1

It is certified that error appears in the above-identified patent and that said Letters Patent is hereby corrected as shown below:

In the Claims

In Column 24, Line 55, in Claim 5, delete "module, that" and insert -- module that --, therefor.

In Column 24, Line 59, in Claim 5, delete "determination by" and insert -- determination, by --, therefor.

In Column 27, Line 13, in Claim 9, delete "of retries" and insert -- of the retries --, therefor.

In Column 28, Line 38, in Claim 13, delete "to a the" and insert -- to the --, therefor.

Signed and Sealed this  
Twenty-fourth Day of April, 2018

Andrei Iancu  
*Director of the United States Patent and Trademark Office*